United States Patent
Lee

(10) Patent No.: US 11,776,101 B1
(45) Date of Patent: Oct. 3, 2023

(54) OPTICAL SENSOR SIGNAL PROCESSING FOR VISUAL ARTIFACT DETECTION AND DISPLAY SELF-DIAGNOSTICS

(71) Applicant: Microsoft Technology Licensing, LLC, Redmond, WA (US)

(72) Inventor: Ki-Chan Lee, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/066,918

(22) Filed: Dec. 15, 2022

(51) Int. Cl.
  *G09G 5/00* (2006.01)
  *G06T 7/00* (2017.01)

(52) U.S. Cl.
  CPC ........... *G06T 7/0002* (2013.01); *G09G 5/006* (2013.01); *G06T 2207/30168* (2013.01); *G09G 2320/0247* (2013.01); *G09G 2320/0257* (2013.01); *G09G 2320/0693* (2013.01); *G09G 2320/08* (2013.01); *G09G 2354/00* (2013.01)

(58) Field of Classification Search
  CPC ..... G06T 7/0002; G06T 2207/30; G06T 7/00; G06T 2207/30168; G09G 5/006; G09G 2320/0247; G09G 2320/0257; G09G 2320/0693; G09G 2320/08; G09G 2354/00
  See application file for complete search history.

(56) References Cited

U.S. PATENT DOCUMENTS

| | | | | |
|---|---|---|---|---|
| 2004/0246434 | A1* | 12/2004 | Ohashi | G09G 3/3406 349/199 |
| 2011/0298765 | A1* | 12/2011 | Butler | G09G 3/3208 345/207 |
| 2012/0176347 | A1* | 7/2012 | Mahajan | G09G 5/00 345/204 |

(Continued)

FOREIGN PATENT DOCUMENTS

| | | |
|---|---|---|
| CN | 105096782 B | 10/2017 |
| EP | 3828676 A1 | 6/2021 |

(Continued)

OTHER PUBLICATIONS

Chen, et al., "Research of an intelligent auto-controlling system for LCD screen Flicker", In Journal of Display Technology, vol. 12, Issue 6, Jun. 2016, pp. 557-561.

*Primary Examiner* — Pegeman Karimi
(74) *Attorney, Agent, or Firm* — Weaver IP L.L.C.

(57) ABSTRACT

Visual artifact detection systems and methods are disclosed herein. In an example system, optical characteristic measurements (e.g., a luminance value) for a display are obtained over a length of time, such as during power cycle events of a computing device coupled to the display. Based on the measurements, ripple values are generated, where each ripple value indicates a change of the optical characteristic over a period of time. A first ripple value is identified that exceeds a threshold and a first time window for identifying a subsequent ripple exceeding the threshold is commenced. If a second ripple value exceeds the threshold in the (Continued)

first time window, a determination is made that the first ripple value corresponds to a visual artifact on the display. In response, a visual artifact indication is generated, such as a notification to a user and/or a dynamic adjustment to a display parameter for remediating the artifact.

20 Claims, 9 Drawing Sheets

(56) References Cited

U.S. PATENT DOCUMENTS

| | | | |
|---|---|---|---|
| 2016/0078842 A1* | 3/2016 | Farenc | H05B 45/30 345/212 |
| 2021/0160414 A1 | 5/2021 | Fu et al. | |

FOREIGN PATENT DOCUMENTS

| | | |
|---|---|---|
| JP | 2009237711 A | 10/2009 |
| WO | 2017038675 A1 | 3/2017 |

* cited by examiner

OPTICAL SENSOR SIGNAL PROCESSING FOR VISUAL ARTIFACT DETECTION AND DISPLAY SELF-DIAGNOSTICS

BACKGROUND

Visual artifacts, such as flickering or scrambling, present in displays are typically unsightly and undesirable to end-users that purchased those displays. These visual artifacts can be caused by a variety of reasons, such as issues with a display driver or inadequate power delivery. In order to test for visual artifacts, a sample of displays can be tested during development and/or after manufacturing to attempt to prevent visual artifacts from being present in released products.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Visual artifact (VA) detection systems and methods are disclosed herein. In an example system, optical characteristic measurements (e.g., a luminance value) for a display are obtained over a length of time, such as during one or more power cycle events of a computing device coupled to the display. Based on the measurements, ripple values are generated, where each ripple value indicates a change of the optical characteristic over a period of time. A first ripple value is identified that exceeds a threshold value, and a first time window for identifying a subsequent ripple exceeding the threshold is commenced at a time corresponding to the first ripple value. If a second ripple value exceeds the threshold in the first time window, a determination is made that the first ripple value corresponds to a visual artifact on the display. In response, a visual artifact indication is generated, such as a notification to a user and/or a dynamic adjustment to a display parameter for remediating the visual artifact.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
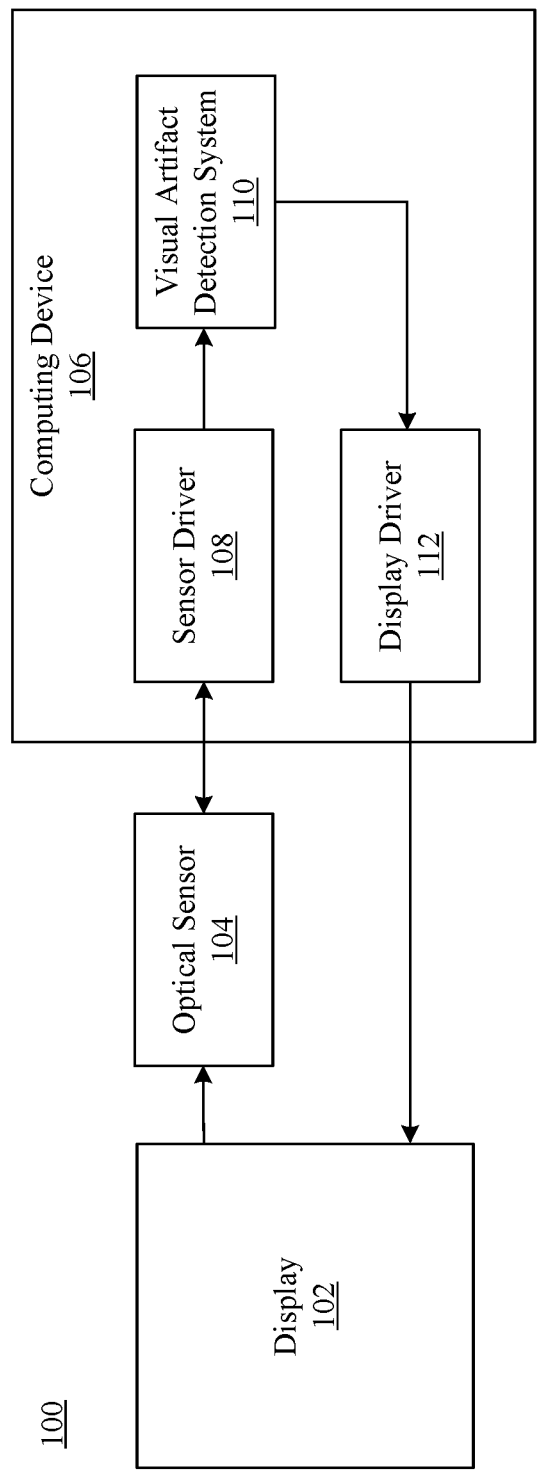
FIG. 1 shows a block diagram of a system for detecting visual artifacts in a display, according to an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Visual artifacts, such as intermittent flicker, sudden shut down, white/black flash, etc., present in displays are typically unsightly and undesirable to end-users that purchased those displays. These visual artifacts can be caused by a variety of reasons, such as issues with a display driver or inadequate power delivery. In order to test for visual artifacts, a sample of displays can be tested during development and/or after manufacturing to attempt to prevent visual artifacts from being present in released products. Despite such testing, however, visual artifacts can still be present in devices sold to end-users, as some types of visual artifacts are caused by conditions for which testing is not suitable or practical. For instance, some types of artifacts occur during a power-on cycle of a computing device to which the display is connected, but only occurs once every several hundred power-on cycles. Other types of visual artifacts are similarly difficult to detect and/or reproduce, even with sophisticated testing that is currently available. In addition, some artifacts are caused by color and/or brightness degradation and/or deviation of liquid crystal displays (LCDs) and light-emitting diode (LED) displays, which occur over time and/or as a result of electrical or thermal stresses. As a result, diagnostic and/or calibration (e.g., to prevent reoccurrence of the artifact) becomes difficult, especially for devices that have left the factory.

As a result of being unable to adequately detect and/or fix visual artifacts (such as temporal visual artifacts) during the development stage and/or in the factory, the user experience of devices containing those visual artifacts can be degraded. For example, while some labor-intensive testing can be employed, such as visually observing a screen for many hours against a large number of different scenarios (e.g., hardware and/or software configurations, power cycle events, etc.), this type of testing is not comprehensive enough to test each possible configuration that could be present. For example, certain visual artifacts appear only with a certain battery level, brightness level, and a specific version of a software installed on a device, all of which can affect the manner in which a display coupled to the device projects images. Because the detection of such visual artifacts is inadequate, determining a root cause to prevent reoccurrence of visual artifacts is similarly difficult Embodiments described herein are directed to detecting visual artifacts in a display. In an example system, a sequence of optical characteristic measurements for at least a portion of the display is obtained using an optical sensor, where each optical characteristic measurement captures an optical characteristic of the display at a different time in the sequence. A plurality of ripple values are generated based at least on the sequence of optical characteristic measurements, where each ripple value is indicative of a change of the optical characteristic over a period of time. A first ripple value of the plurality of ripple values is identified that exceeds a threshold ripple value. A determination is made whether a second ripple value of the plurality of ripple values exceeds the threshold ripple value in a first time window, where the first time window commences at a time associated with the first ripple value. In response to a determination that the second ripple value exceeds the threshold ripple value, a determination is made that the first ripple value corresponds to a visual artifact. A visual artifact indication is generated in response to the determination that the first ripple value corresponds to a visual artifact.

The techniques described herein advantageously provide improvements to computing components, and in particular, computer displays. For instance, by identifying visual artifacts present in a display, appropriate changes can be made to reduce and/or prevent reoccurrence of the artifacts in the future, such as by changing a display driver parameter, a power supply parameter, or various other parameters that affect the electrical signals provided to the display. By reducing and/or preventing reoccurrence of these visual artifacts, the functioning and/or performance of the display device is thereby improved, along with the user experience. In addition, the disclosed techniques are implementable on end-user devices after those devices have left the factory (e.g., to detect visual artifacts in real-world scenarios), which reduces the need for expensive visual artifact testing at the factory that often entails testing many different scenarios (e.g., hardware and/or software configurations) in an attempt to identify and/or reproduce a visual artifact. This type of expansive testing at the factory typically encompasses testing of additional scenarios that are unnecessary and often utilizes excessive computing resources (e.g., recording and/or storing a large amount of video recorded for a given device, and processing that video to identify abnormalities). With implementation of the disclosed techniques, visual artifact testing is able to be performed on the device on an actual end-user device (e.g., as a self-diagnostic or self-calibration procedure), thereby streamlining the detection of visual artifacts that are present on that device based on that device's configuration and physical properties (e.g., differences in fabrication of certain components due to manufacturing tolerances, such as imbalance charges relating to individual pixels that can affect flickering), resulting in an overall reduction of computing resources needed to detect artifacts. Further, rather than recording, storing, and/or processing large amount of video data, the disclosed techniques enable the identification of visual artifacts in a display using optical sensors measurements (e.g., a brightness measurement) that comprise less data (and therefore less processing). Thus, not only do the described techniques allow for an improved display quality by reducing or eliminating visual artifacts, but the disclosed techniques also achieve such an advantage with fewer consumed resources.

Embodiments are implemented in various ways to detect visual artifacts in a display. For instance, FIG. 1 shows a block diagram of a system 100 for detecting visual artifacts in a display, according to an example embodiment. As shown in FIG. 1, system 100 includes a display 102, an optical sensor 104, and a computing device 106. Computing device 106 includes a sensor driver 108, a visual artifact (VA) detection system 110, and a display driver 112. In embodiments, display 102, optical sensor 104, and/or computing device 106 are communicatively coupled via any combination of a wired and/or wireless connection. Examples such connections include, but are not limited to, a High-Definition Multimedia Interface (HDMI) cable, a video graphics array (VGA) cable, a universal serial bus (USB) cable, digital video interface (DVI) cable, a DisplayPort interface, a component video interface, a composite video interface, and a coaxial video interface, a Bluetooth™ interface, an infrared (IR) connection, and/or a network connection (e.g., a local area network (LAN), a wide area network (WAN), an enterprise network, the Internet, etc.).

In embodiments, display 102 is coupled to computing device 106 and configured to display any combination of still and/or moving images based on a video signal received from computing device 106. In examples, display 102 comprises a liquid crystal display, cathode ray tube display, light-emitting diode display, a plasma display, a projector, or any other type of display that is coupled to computing device 106 for presenting an image (i.e., a collection of pixels) based on a video signal therefrom. In some examples, display 102 is external to computing device 106, such as a standalone monitor or television, that is connected to computing device 106 via a communication interface. In other examples, display 102 is physically coupled to computing device 106, such as a display of a table computing device or laptop computer. For instance, display 102 comprises a display that is movably attached (e.g., at a pivot point) to computing device 106, such that display 102 is rotatable from a closed position in which the display is not viewable to a user to an open position in which the display is viewable.

Optical sensor 104 is configured to measure (e.g., capture) one or more optical characteristics of display 102. In examples, the optical characteristics include any one or more of a luminance, color, and/or brightness of display 102. In various embodiments, optical sensor 104 is positioned to measure an optical characteristic in a particular portion or region of display 102 (e.g., in a center, in a corner, etc.). In other embodiments, a plurality of optical sensors are present, each optical sensor configured to measure an optical characteristic of a different portion and/or optical characteristic of display 102. In some implementations, optical sensor 104 is physically attached (e.g., with a common housing) as display 102 and/or computing device 106. In one example, optical sensor 104 comprises a sensor that is placed in a base portion of a laptop computer wherein the base portion is movably (e.g., rotatably) attached to display 102. In another example, optical sensor 104 comprises a sensor (e.g., a front-facing camera) that is part of a common housing of display 102 (e.g., in a display bezel portion thereof). In yet another example, optical sensor 104 comprises an external sensor that is communicatively coupled (e.g., via a wired connection, such as USB, or via a wireless connection) that is positioned in a manner to capture an optical characteristic of display 102.

Optical sensor 104 comprises any type of light capturing element, including but not limited to a camera (e.g., a complementary metal-oxide semiconductor (CMOS) sensor, a charge-coupled device (CCD) sensor, or other pixel array for capturing red, green, and blue (RGB) pixel information), a photodiode, a photosensor, a photodetector (e.g., an ambient light sensor), a spot optical sensor configured to capture an optical characteristic in a particular spot of display 102, or any other type of element or detector that captures an optical characteristic of display 102 and converts the captured characteristic into an electronic signal. In some implementations, optical sensor 104 comprises one or more color filters configured to filter out a particular color or colors from being measured.

In various examples, a measurement obtained from each optical sensor comprises a single numerical value (e.g., a luminance value) at a given point in time. As an example, where optical sensor 104 comprises a CMOS sensor, CCD sensor, or other type of sensor which may capture large amounts of data at a single point in time, such data can be processed (e.g., aggregated and/or averaged) in a manner to determine a single optical characteristic measurement (e.g., the luminance) of the display as a whole, thereby reducing the amount of data stored. In other words, rather than storing data at the pixel level, the captured sensor data can process the captured information to determine and/or store an optical characteristic measurement at a level that encompasses a large number of pixels. In some examples, a grouping of pixels corresponding to a center of a display are used for each optical characteristic measurement. In other examples, a predetermined number of groupings are identified (e.g., one grouping in the center, and one grouping in each corner of the display), where each grouping of pixels corresponds to an optical characteristic measurement.

Computing device 106 is any type of processing device, including, but not limited to, a desktop computer, a server, a mobile or handheld device (e.g., a tablet, a personal data assistant (PDA), a smart phone, a laptop, etc.), an Internet-of-Things (IoT) device, a testing device (e.g., a color meter, automatic test equipment (ATE), etc.), or other suitable device mentioned elsewhere herein or otherwise known. In various embodiments, computing device 106 and display 102 comprise a single apparatus, such as a computing device with screen attached thereto. In other examples, computing device 106 is separate from display 102. In various examples, computing device 106 comprises devices sold by a manufacturer to an end-user. In other examples, computing device 106 comprises devices manufactured devices that have not yet been sold (e.g., devices in a production facility).

Sensor driver 108 is configured to drive optical sensor 104. For instance, sensor driver 108 provides sufficient power to optical sensor 104 and provides a signal to optical sensor 104 to measure an optical characteristic of display 102. In implementations, sensor driver 108 controls the frequency (e.g., 60 Hz) at which optical sensor 104 is configured to measure optical characteristics. Such a frequency is configurable via VA detection system 110 or via other means (e.g., a user input in a software application for configuring various operations of VA detection system 110).

In various embodiments, VA detection system 110 and/or sensor driver 108 are implemented in a dedicated hardware component or other computing component such VA detection system 110 and/or sensor driver 108 receive power when computing device 106 is powered on. In one example, sensor driver 108 provides power to optical sensor 104 upon computing device 106 being powered on, such that optical sensor 104 captures optical characteristic measurements after being powered on. In this manner, optical sensor 104 is configured to begin capturing measurements of display 102 upon computing device being powered up (rather than at a later time, such as after an operating system is executing). This enables measurements of the display to be obtained and/or logged during power cycling (e.g., powering on and powering off a computing device repeatedly) when certain visual artifacts tend to occur. In such an example, once a software application for analyzing the optical characteristic measurements has executed on computing device (e.g., after an operating system has booted), the measurements are fed to the software application for analysis to determine if a visual artifact was identified during the power cycling.

Visual artifact (VA) detection system 110 is configured to detect a visual artifact observed in display 102 based on processing a plurality of optical characteristic measurements. In an example, VA detection system 110 receives the plurality of optical characteristic measurements from optical sensor 104 over time. Based on the measurements, VA detection system generates a plurality of ripple values. Each ripple value indicates, for instance, a change in the optical characteristic over a period of time (e.g., a rate of change). If a ripple value exceeds a threshold, a first time window is commenced for monitoring subsequent ripple values that also exceed the threshold. If it is determined that a subsequent ripple value also exceeds the threshold in the first time window, a determination is made that the first ripple value is a visual artifact. In some further examples, an additional shorter time window is also implemented to filter out image transitions that are deemed to be normal (i.e., not indicative of a visual artifact), so as to reduce false positives.

In various embodiments, in response to detecting a visual artifact on display 102, VA detection system 110 is configured to generate a visual artifact indication. In examples, the visual artifact indication comprises a notification, such as a visual notification (e.g., an alert displayed on display 102 or another display device), an audio notification, or a combination thereof. In other examples, the visual artifact indication comprises a signal provided to display driver 112 to adjust one or more display parameters to reduce the likelihood and/or prevent reoccurrence of the visual artifact. In some other examples, the indication comprises an event that is stored in an event log (e.g., on computing device 106 or another computing device not shown). Further examples and details regarding the operation of VA detection system 110 are described below.

Display driver 112 is configured to generate video signals for outputting to display 102. In various embodiments, display driver 112 changes any number of parameters relating to the generation of such video signals, such as a refresh rate, a power parameter of one or more components in computing device 102 (e.g., a power provided to a graphics module, power delivery to computing device 106 from a power source, etc.), a color or gamma adjustment in the outputted video signal, a common voltage (VCOM) value, etc. The foregoing list is intended to be illustrative only, and it should be understood that display driver 112 perform various other types of adjustments based at least on a detected visual artifact in some embodiments.

Implementations are not limited to the illustrative arrangement shown in FIG. 1. For instance, display 102, optical sensor 104, and/or computing device 106 not be separate from each other. In some examples, any one or more of display 102, optical sensor 104, and/or computing device 106 (or any subcomponents therein) is located in or accessible via the same computing device or implemented across a plurality of computing components.

Figure 2:
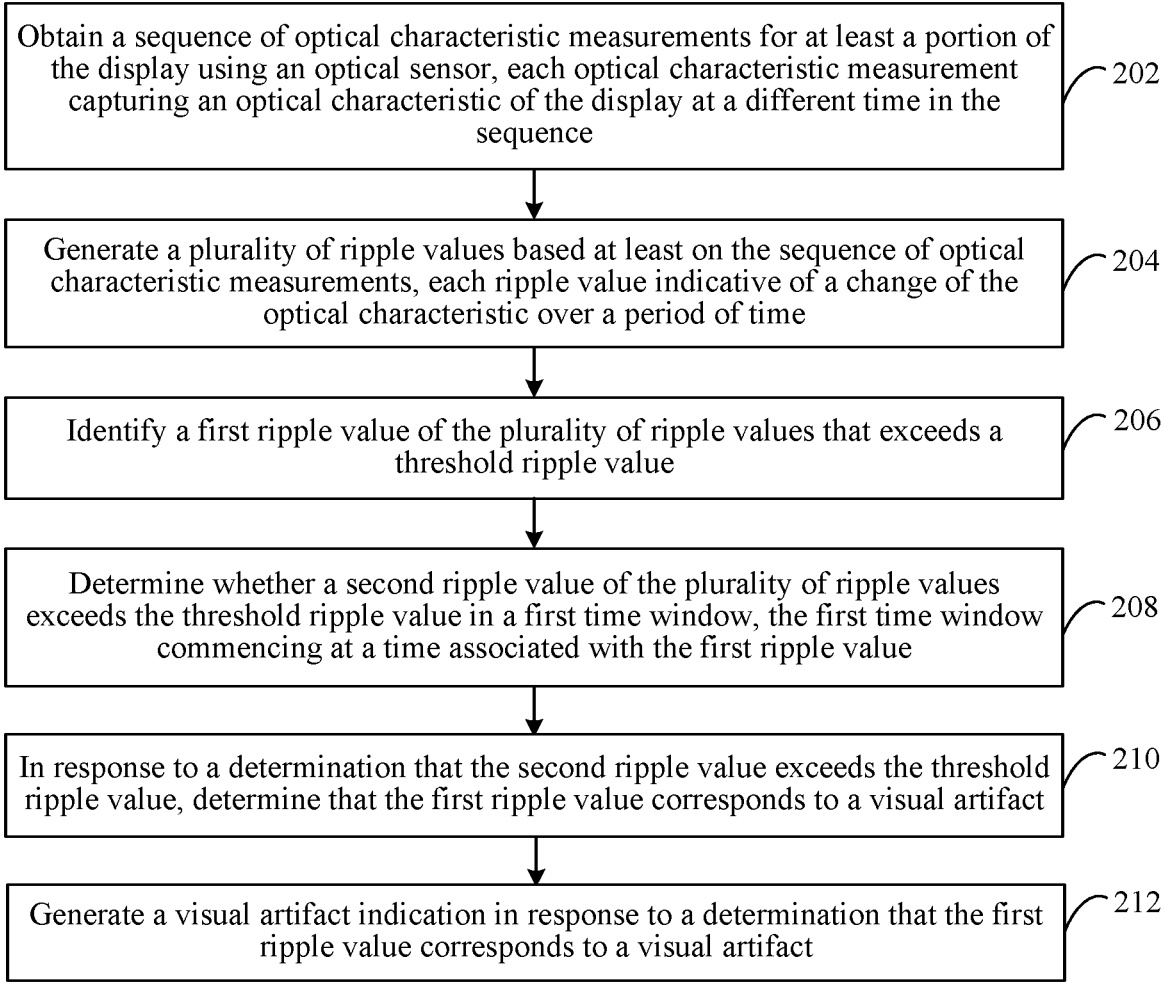
FIG. 2 shows a flowchart of method for detecting visual artifacts in a display, in accordance with an example embodiment.

VA detection system 110 operates in various ways to detect visual artifacts in a display. For instance, VA detection system 110 operate according to FIG. 2 in an example embodiment. FIG. 2 shows a flowchart 200 of a method for detecting visual artifacts in a display, in accordance with an example embodiment. For illustrative purposes, flowchart 200 and VA detection system 110 are described as follows with respect to FIG. 3. While example embodiments are described with respect to flowchart 200 and components of system 300, these examples are illustrative.

Figure 3:
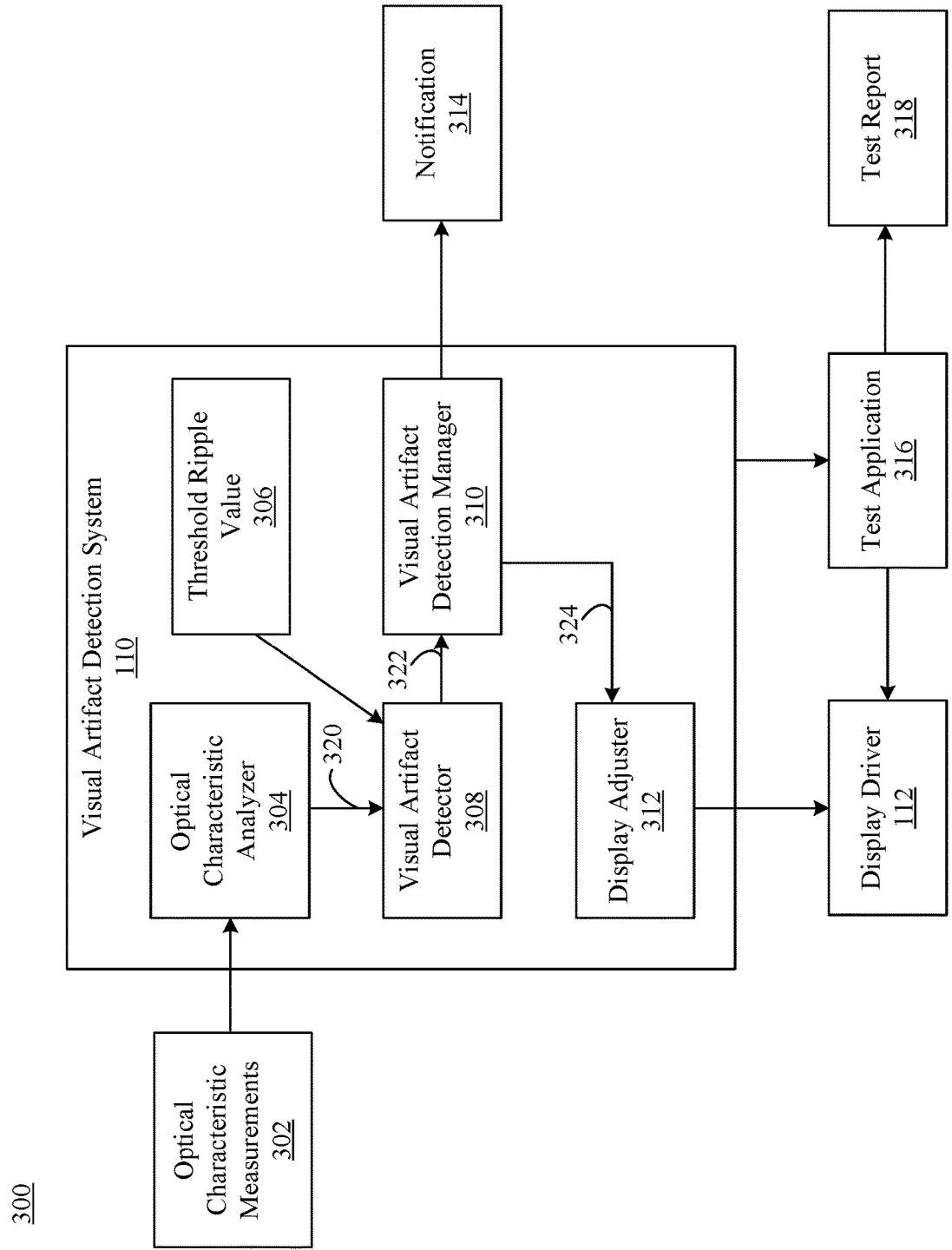
FIG. 3 shows a block diagram of a system for detecting visual artifacts in a display, in accordance with an example embodiment.

FIG. 3 shows a block diagram of a system 300 for detecting visual artifacts in a display, in accordance with an example embodiment. As shown in FIG. 3, system 300 includes an example implementation of VA detection system 110 and display driver 112. System 300 also includes optical characteristic measurements 302 provided to VA detection system 110, a notification 314, a test application 316, and a test report 318. VA detection system 110 includes an optical characteristic analyzer 304, a threshold ripple value 306, a VA detector 308, a visual artifact detection (VAD) manager, and a display adjuster 312. Flowchart 200 and system 300 are described in further detail as follows.

Flowchart 200 begins with step 202. In step 202, a sequence of optical characteristic measurements are obtained for at least a portion of a display using an optical sensor, where each optical characteristic measurement captures an optical characteristic of the display at a different time in the sequence. For instance, with reference to FIGS. 1 and 3, sensor driver 108 is configured to drive optical sensor 104 to obtain optical characteristic measurements of display 102 at different points in time (e.g., at a frequency of 60 Hz), such that a sequence of optical characteristic measurements are obtained. In examples, each optical characteristic measurement captures an optical characteristic (e.g., a luminance value, a color value, etc.) of display 102. In some implementations, the optical characteristic corresponds to a particular region of a display (e.g., in a center of display 102) in which optical sensor 104 is positioned and/or directed.

In examples, optical characteristic analyzer 304 obtains each optical characteristic measurement and stores each measurement in a log (e.g., a table, a database, etc.) along with a time that the optical characteristic was captured, a value associated with the optical characteristic measurement (e.g., a number representing a luminance or color value), and/or a region of the display in which the optical sensor corresponding to the measurement was positioned. In various embodiments, optical characteristic analyzer 304 is configured to receive each optical characteristic measurement in real-time or near real-time, such that optical characteristic analyzer 304 is continuously logging measurements as they captured by optical sensor 104.

In step 204, a plurality of ripple values is based at least on the sequence of optical characteristic measurements. For instance, with reference to FIG. 3, optical characteristic analyzer 304 is configured to generate a plurality of ripple values based at least on the sequence of optical characteristic measurements 302 and provide each of the ripple values 320 to VA detector 308. In examples, each ripple value (also referred to as a flicker modulation amplitude, or FMA) is indicative of a change of the optical characteristic over a period of time. In one implementation, the ripple value represents a rate of change of the optical characteristic as measured by a sensor. In another implementation, the ripple value represents a delta or difference between a pair of optical characteristic measurements (e.g., subsequent measurements that are obtained by the sensor) divided by a time difference between the pair of measurements, which can be further divided by an average optical characteristic value (e.g., the average value of the two measurements in the pair).

Accordingly, the ripple value, or FMA, for two optical characteristic measurements, $L_0$ and $L_1$, is represented as follows in some implementations:

$$FMA = \frac{\frac{\Delta L}{\Delta T}}{L_{avg}},$$

where $\Delta L$ represents the delta between $L_0$ and $L_1$, $\Delta T$ represents the difference in time between the measurements of $L_0$ and $L_1$, and $L_{avg}$ represents the average value of $L_0$ and $L_1$. It should be understood, however, that this example is not intended to be limiting, and each ripple value can be generated in various other ways such that the generated values are indicative of a change of an optical characteristic over a period of time.

Generating the plurality of ripple values as disclosed allows for changes in screen behaviors occurring over time to be captured and/or stored in a more efficient manner. For instance, rather than other techniques which can result in storing large amounts of data (e.g., recording and storing a video of a display at a high resolution and/or high framerate) and processing such data, the disclosed techniques enable capturing changes in optical characteristics (e.g., changes in luminance or brightness values) over time, which consumes far less storage and processing resources. In other words, data that is relevant to the determination of whether a visual artifact is present on a display (e.g., the optical characteristic values and time of capture from which ripple values are generated) is captured in accordance with the disclosed techniques, while extraneous information (e.g., video data) need not be maintained. In addition, where a camera sensor is utilized in accordance with disclosed techniques, raw camera data need not be stored, but instead ripple values generated therefrom are stored during the determination of determining whether a visual artifact is present, thereby resulting in a reduction of storage and processing resources.

In step 206, a first ripple value of the plurality of ripple values that exceeds a threshold ripple value is identified. For instance, with reference to FIG. 3, VA detector 308 is configured to identify a first ripple value of the plurality of ripple values that exceeds threshold ripple value 306. Threshold ripple value 306 comprises a value above which a visual artifact is potentially present. In some implementations, threshold ripple value 306 is preconfigured in VA detection system 110. In other implementations, threshold ripple value 306 is programmable by a user (e.g., via a user input). In various embodiments, threshold ripple value is a percentage (e.g., 5%, 10%, etc.), where ripple values that exceed the percentage potentially correspond to visual artifacts.

As an illustration, if a display presented a still image (e.g., no image transitions to different images), the plurality of ripple values during such time that the still image was presented would be constant (e.g., a value of zero, since a luminance of the display did not change in this time period). However, if a second image was subsequently displayed, one or more ripple values can indicate a spike that represents the transition from the first image to the second image, where the spike exceeds threshold ripple value 306. In many instances, the ripple value corresponding to the spike merely represents a normal image transition rather than a visual artifact. However, in some other instances, a spike in a ripple value is accompanied by one or more additional spikes, in which case the first spike is indicative of a visual artifact rather than a normal image transition.

In some implementations, identification of the first ripple value of the plurality of ripple values that exceeds a threshold ripple value causes VA detector 308 to commence a first time window (e.g., a time corresponding to the first ripple value, such as a time based on either or both of the optical characteristic measurements that formed the basis of the first ripple value). In examples, the first time window represents a window for monitoring additional ripple values. In various embodiments, the first time window has a fixed length (e.g., 500 milliseconds). In some further implementations, each ripple value that exceeds the threshold commences the activation of a respective time window with this same length, such that each ripple value that exceeds the threshold is analyzed separately as a potential visual artifact. In other words, each ripple value that exceeds the threshold results in a new set of windows (i.e., the first window and second window as described herein) to be activated for monitoring.

In step 208, a determination is made whether a second ripple value of the plurality of ripple values exceeds the threshold ripple value in a first time window, where the first time window commences at a time associated with the first ripple value. For instance, with reference to FIG. 3, VA detector 308 determines whether a second ripple value of the plurality of ripple values exceeds threshold ripple value 306 in the first time window that commenced at a time associated with the first ripple value. As described earlier, the identification of a first ripple value that exceeds threshold ripple value 306 activates a first time window for monitoring subsequent ripple values. VA detector 308 is configured to identify whether any one or more of those subsequent ripple values also exceeds threshold ripple value 306 in the time window (e.g., within 500 milliseconds after a measurement corresponding to the first ripple value). In other words, VA detector 308 is configured to determine whether any subsequent ripple values in the time window also comprise spikes that exceed the same threshold.

Identifying both a first ripple value and second ripple value that exceed the threshold ripple value as described has numerous advantages, such as enabling the detection of potentially abnormal conditions presented on a display with reduced computing resources. For instance, rather than utilizing techniques that require a large amount of data processing and analysis (such as by analyzing a recorded video of a display taken over a lengthy test period), the disclosed techniques compare the generated ripple values (which, as discussed earlier, requires fewer resources) and the threshold value. This streamlined comparison of numerical values utilizes far less resources and can be performed quicker, resulting in the identification of potentially abnormal conditions with improved performance overall. In addition, since the comparison between the ripple values and the threshold ripple value can be performed more efficiently, implementing appropriate changes to remediate abnormal artifacts to improve the image quality can be carried out sooner.

Still further, determining whether the second ripple value exceeds the threshold in the first time window allows for the detection of relatively short-lived visual artifacts and/or visual artifacts that do not periodically appear on a display. For instance, implementing the first time window in which the presence of multiple ripple values exceeding the threshold is potentially indicative of a visual artifact allows for identifying the presence of visual artifacts that have a duration less than the length of the first time window. In addition, since the time window commences at a time associated with the first ripple value (and is not reliant on other time windows), any additional ripple value exceeding the threshold in the same time window is a potential visual artifact, even if similar screen behaviors are not observed again. Thus, not only do the disclosed techniques allow for a reduction in computing resources to identify visual artifacts, but the disclosed techniques can also enhance the quality of the detection (and improved overall image quality).

In step 210, in response to a determination that the second ripple value exceeds the threshold ripple value, the first ripple value is determined to correspond to a visual artifact. For instance, with reference to FIG. 3, VA detector 308 is configured to determine, in response to a determination that the second ripple value exceeds threshold ripple value 306 in the first time window, that the first ripple value corresponds to a visual artifact 322 observed on display 102. For instance, when multiple ripple values exceed the threshold ripple value in the first time window, it is determined that at least the first ripple value does not correspond to a normal image transition, but rather corresponds to a visual artifact (e.g., a flicker or other visual artifact) in various embodiments. In some embodiments, VA detector 308 also implements an additional shorter time window in which events are also monitored to filter out display behaviors corresponding to normal image transitions. Additional details and examples describing the operation of a second time window are provided below.

A visual artifact comprises any type of abnormality displayed on one or more portions of a screen that does not correspond to (e.g., is different from) a normal or expected image or image transition. For example, a visual artifact as disclosed herein comprises a difference between an image that is actually displayed on a screen and an image that should be displayed based on the video signal provided to the display. Such visual artifacts include, but are not limited to flashing (e.g., brightness spikes, white flashing, black flashing), shading (e.g., dimming), flickering (e.g., relatively quick changes in brightness, which can be intermittent), sparkling (e.g., a snowy appearance), scrambling (e.g., indecipherable portions of a screen), shifting (e.g., unexpected movement of images), juddering (e.g., appearance of a vibration of portions of a screen), or a shutdown (e.g., sudden loss of power) of one or more pixels. Visual artifacts include temporal visual artifacts that occur on a screen at a point in time but does not appear at other points in time, spatial visual artifacts that occur in a particular region of a screen for at least some longer period of time, and spatiotemporal visual artifacts (e.g., a combination of the foregoing). These examples are only illustrative, and other types of visual artifacts are also contemplated to be within the scope of the disclosure.

Conversely, if no ripple values are identified that exceed the threshold in this first time window (e.g., a second ripple value was not identified in the time window that exceeds the threshold), VA detector 308 determines that the first ripple value does not correspond to a visual artifact in various embodiments. In such a scenario, the first ripple value that exceeded the threshold could have occurred for reasons other than a visual artifact, such as a normal image transition (e.g., displaying one image after another image in a typical fashion).

As discussed earlier, determining whether the second ripple value exceeds the threshold ripple value in the disclosed manner allows for both a reduction in computing resources and improved overall performance (e.g., improved accuracy and speed) in identifying the presence of a visual artifact on a display.

In step 212, a visual artifact indication is generated in response to a determination that the first ripple value corresponds to a visual artifact. For instance, with reference to FIG. 3, VAD manager 310 is configured to obtain an identification of the identified visual artifact 322 and generate a visual artifact indication in response to a determination that the first ripple value corresponds to a visual artifact. In embodiments, the visual artifact indication comprises notification 314 (e.g., a notification provided to a user in a user interface) and/or a signal 324 to display adjuster 312 to calibrate or adjust a display parameter based on the observed visual artifact. Additional details and examples regarding the generation of the visual artifact indication are described below.

Compared to conventional analysis techniques, such as those that use Fast Fourier Transform (FFT), the disclosed techniques allow for a quick and accurate identification of temporal visual artifacts. Because conventional FFT techniques are based on a frequency domain analysis, such techniques fail to adequately identify temporal visual artifacts (e.g., artifacts that occur once in several hundred power cycles). In other words, FFT techniques may provide insight on what happens to a signal, rather than when it happens. For this reason, such conventional techniques may need several thousand power cycles that have many instances of the same artifact before any meaningful analysis can be performed. Not only do those techniques require more usage of computing resources (e.g., more power cycling, more data collection and storage, etc.), those techniques are limited in their accuracy (e.g., visual artifacts that do not occur periodically are not easily detectible using FFT techniques) and take longer to complete.

Rather, as described herein, the disclosed embodiments enable the identification of visual artifacts that occur in real-time (or near real-time) with reduced utilization of computing resources and enhanced accuracy, thereby also improving the overall image quality of the display. For instance, VA detection system 110 is able to detect any periodic and/or non-periodic visual artifacts in various embodiments up to a desired frequency (e.g., up to 40 Hz). In addition, VA detection system 110 provides a filtering mechanism as described herein for filtering out normal image transitions (e.g., measurements that indicate an optical transient but not necessarily a visual artifact) happening during the course of various system operations, such as during boot-up, power down, sleep or hibernate, wake-up, etc. Further, VA detection system 110 as described herein is able to provide information relating to each identified visual artifact (e.g., when the visual artifact occurred, what conditions were present, etc.) and is optionally able to execute one or more follow up actions (e.g., triggering other captures of electrical signals coupled to the display, such as using an oscilloscope and/or using a protocol analyzer), to remediate the visual artifact in real-time or near real-time.

Figure 4:
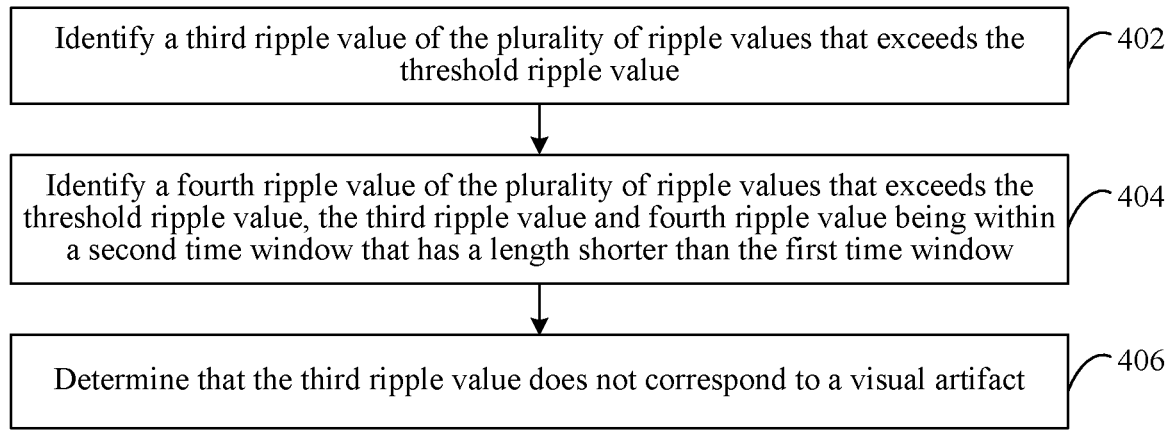
FIG. 4 shows a flowchart of a method for determining that a ripple value does not correspond to a visual artifact, in accordance with an example embodiment.

In accordance with one or more embodiments, an additional time window is implemented for preventing certain types of events from being deemed visual artifacts. For example, FIG. 4 shows a flowchart 400 of a method for determining that a ripple value does not correspond to a visual artifact, in accordance with an example embodiment. In an embodiment, flowchart 400 is implemented by system 300 as shown in FIG. 3. Accordingly, flowchart 400 will be described with reference to FIG. 3. Other structural and operational embodiments will be apparent to persons skilled in the relevant art(s) based on the following discussion regarding flowchart 400 and system 300 of FIG. 3.

Flowchart 400 begins with step 402. In step 402, a third ripple value of the plurality of ripple values that exceeds the threshold ripple value is identified. For instance, with reference to FIG. 3, VA detector 308 is configured to identify a ripple value (e.g., a third ripple value) among the plurality of ripple values that are generated that exceeds threshold ripple value 306. In various embodiments, the threshold that is exceeded is the same threshold exceeded by the first ripple value described above. In other embodiments, the threshold ripple values are different from each other (e.g., a first threshold for identifying a visual artifact as described above, and a second threshold for filtering out certain types of events).

In step 404, a fourth ripple value of the plurality of ripple values that exceeds the threshold ripple value is identified. For instance, with reference to FIG. 3, VA detector 308 is also configured to identify an additional ripple value that exceeds threshold ripple value 306 (which is the same or different from the threshold ripple value described with respect to FIG. 2). In an example, the third and fourth ripple values are identified within a second time window that has a shorter length than the first time window described above with respect to FIG. 2.

For instance, when a ripple value (e.g., the third ripple value) is identified that exceeds the threshold ripple value, both a first time window and a second time window are activated, where the first time window is longer than the second time window. The first time window comprises a longer timeframe (e.g., 500 milliseconds) over which subsequent ripple values are monitored to determine whether the first ripple value (and one or more other ripple values) corresponds to a visual artifact. The second time window comprises a shorter timeframe (e.g., 100 milliseconds) in which the first ripple value is not necessarily identified as corresponding to a visual artifact even if additional ripple values are identified in the timeframe that exceed the threshold.

Identifying a third ripple value and fourth ripple value, as disclosed, has at least similar advantages with respect to identifying the first ripple value and second ripple value as described above. For instance, identifying these ripple values (any of which are potentially indicative of an abnormal visual artifact) can be performed using far less data and computations compared to other techniques, thereby enabling the identification of possible artifacts on a display in a quicker manner (e.g., in real-time or near real-time).

In step 406, a determination is made that the third ripple value does not correspond to a visual artifact. For instance, with reference to FIG. 3, VA detector 308 is configured to determine that the third ripple value does not correspond to a visual artifact based at least on the fourth ripple value exceeding threshold ripple value 306 in the second time window. In other words, where multiple ripple values are identified that exceed threshold ripple value 306 in a relatively shorter window of time (e.g., a fraction of the first time window), VA detector 308 is configured to infer that one or more of such ripple values that exceeded the threshold do not correspond to visual artifacts by virtue of the other ripple values that exceeded the threshold in this window. However, because a first time window (i.e., a longer time window) is also activated at a time corresponding to the third ripple value that exceeded the threshold, any subsequent ripple values that exceed the threshold ripple value outside of the shorter second time window but still within the longer first time window result in the third ripple value being deemed a visual artifact in various embodiments. In other words, while the filtering achieved by the shorter time window is implementable to reduce multiple ripple values exceeding the threshold in a relatively shorter period of time from being deemed a visual artifact, other events outside of the shorter time window are still monitored such that previous events in the longer time window can subsequently be deemed visual artifacts.

In implementations, such filtering implemented by activation of a second time window reduces the number of observed events from being falsely identified as a visual artifact. In particular, certain types of image transitions on display 102 can result in multiple optical characteristic changes in a relatively short period of time. While such image transitions are not necessarily desirable (e.g., rough image transitions), those image transitions may nevertheless be normal, rather than the result of a visual artifact. In addition, such types of transitions are often less noticeable and/or bothersome given the relatively shorter time period over which the optical characteristics changed. As a result, such types of transitions are not identified as visual artifacts, unless additional events within the larger time window are observed that exceed the threshold ripple value.

In this manner, normal screen behaviors (e.g., normal image transitions) can be filtered out, resulting in improved accuracy in identifying true visual artifacts. Further, by reducing the likelihood of falsely identifying certain screen conditions as visual artifacts as described using a second (shorter) time window, unnecessary notifications relating to falsely identified visual artifacts can be reduced and/or avoided, thereby conserving processing, memory, and/or networking resources in generating, storing, and/or transmitting those notifications. In addition, implementation of the second time window can also prevent an unnecessary calibration signal from being provided to a component (e.g., a display-related component) of the computing device due to a false identification of a visual artifact. For instance, unnecessary adjustments to the manner in which a display presents images can result in further monitoring of the display (e.g., restarting a test flow or performing additional test scenarios) where such monitoring was not needed. Not only can such monitoring consume more computing resources, but unnecessary changes to the manner in which images are presented on a display can result in visual artifacts being unintentionally generated.

Figure 5:
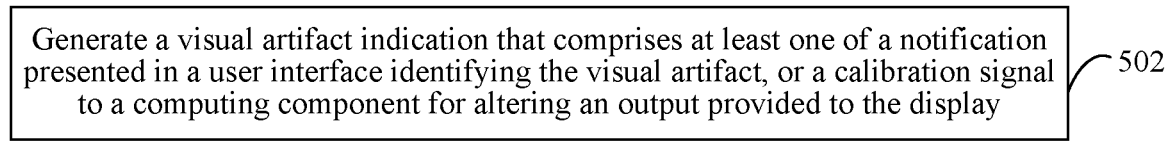
FIG. 5 shows a flowchart of a method for generating a visual artifact indication, in accordance with an example embodiment.

In accordance with one or more embodiments, an indication is generated in response to determining that a ripple value corresponds to a visual artifact. For example, FIG. 5 shows a flowchart 500 of a method for generating a visual artifact indication, in accordance with an example embodiment. In an embodiment, flowchart 500 is implemented by system 300 as shown in FIG. 3. Accordingly, flowchart 500 will be described with reference to FIG. 3. Other structural and operational embodiments will be apparent to persons skilled in the relevant art(s) based on the following discussion regarding flowchart 500 and system 300 of FIG. 3.

Flowchart 500 begins with step 502. In step 502, a visual artifact indication is generated that comprises at least one of a notification presented in a user interface identifying the visual artifact or a calibration signal to a computing component for altering an output provided to the display. For instance, with reference to FIG. 3, VAD manager 310 is configured to generate notification 314 that is presented in a user interface (e.g., of computing device 106) that identifies the observed visual artifact. In examples, notification 314 also comprises other information (e.g., a report) associated with the observed visual artifact, such as a time or event (e.g., a boot-up procedure, a test condition, etc.) leading to the visual artifact, the type of visual artifact (e.g., flickering, scrambling, etc.), a cause of the visual artifact (e.g., a particular hardware and/or software component issue), and/or possible remediation actions that can be implemented manually and/or automatically to reduce the likelihood of reoccurrence of the visual artifact. In some examples, notification 314 is stored in a log on computing device 106 for viewing by the user upon opening the log. In other examples, notification 314 is presented to the user in real-time or near-real time (e.g., as a pop-up or push notification) alerting the user of the observed artifact.

In some implementations, such as where computing device 106 is a device that has been sold to a consumer, notification 314 can be provided to a manufacturer and/or servicer of a hardware and/or software component of computing device 106 such that visual artifacts observed in end-user devices are monitored and/or logged for various purposes, such as for providing product updates and/or designing future products that reduce the likelihood of reoccurrence of such artifacts.

In some other implementations, the visual artifact indication comprises a calibration signal configured to adjust the manner in which display 102 displays images. For instance, the calibration signal is configured to change or alter the operation of one or more computing components (e.g., a display driver) associated with the generation of the signal transmitted display 102 and/or one of the electrical components within display 102. Such a calibration signal includes, but is not limited to, a change in a color value of one or more pixels, a brightness value of one or more pixels, a gamma value of one or more pixels, a VCOM level, a refresh rate, a power delivery parameter (e.g., an amount or rate of power provided in the signal sent to display 102 or used by certain components, such as a graphics module), a firmware or software parameter, a timing control (TCON) parameter, a transistor parameter of the display, a power management integrated circuit (PMIC) parameter, a display driver integrated circuit (DDIC) parameter, a light emitting diode (LED) driving parameter, or any combination thereof.

For example, with respect to a refresh rate (or refresh frequency), the rate is often set lower when power saving features are desired. However, a lower refresh rate can also result in visual artifacts (e.g., flickering), which can be different based on each individual display that is fabricated. Thus, while conventional techniques for sampling devices at the factory would be insufficient to test such scenarios that are dependent on the physical properties of a given device, techniques described herein can be implemented to identify conditions that lead to visual artifacts for a given device and remediate those artifacts by dynamic changes that are made to the computing device and/or display.

In some other implementations, the visual artifact indication comprises a signal to collect and/or analyze additional data (e.g., optical data, electrical data, etc.) such as from various internal and/or external hardware and software components coupled to the computing device and/or display. In examples, this data collection aids in debugging the various components (e.g., operating system, hardware components, electrical components, software components, etc.) of the computing device that can contribute to the presence of an artifact in order to identify a root cause and/or reduce the likelihood that the visual artifact reoccurs in the future.

As described herein, different types of visual artifacts are detectable by VA detection system 110. For instance, FIGS. 6A-6D depict various illustrative scenarios in which optical characteristic measurements are obtained to determine whether a visual artifact is present. It should be noted that these examples are not intended to be limiting, and are intended to illustrate the operation of VA detection system 110 in example scenarios.

Figure 6A:
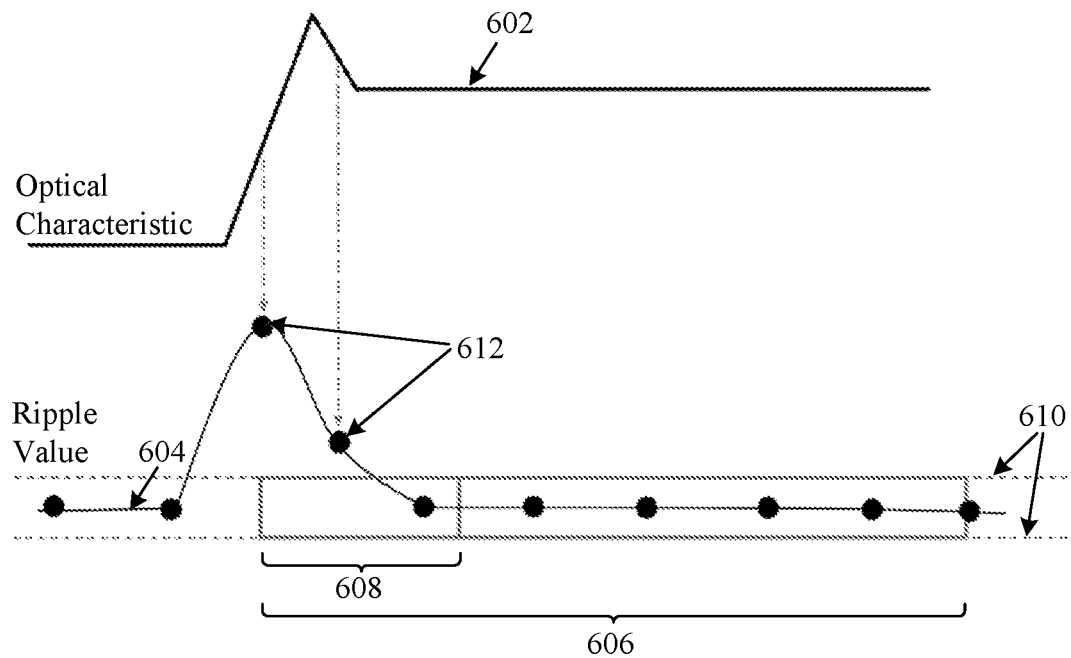
FIGS. 6A-6D depict various illustrative scenarios in which optical characteristic measurements are obtained to determine whether a visual artifact is present, in accordance with various example embodiments.
Figure 6B:
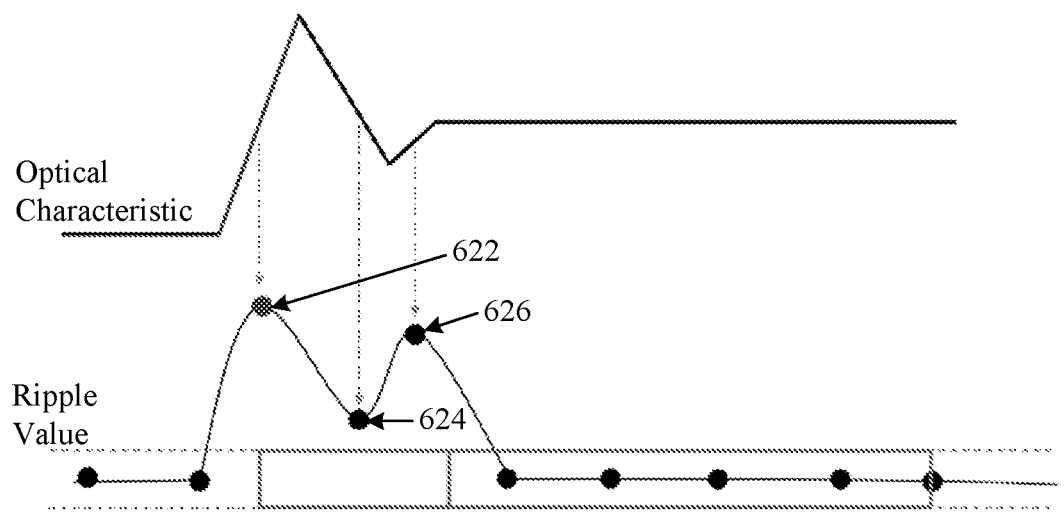
Figure 6C:
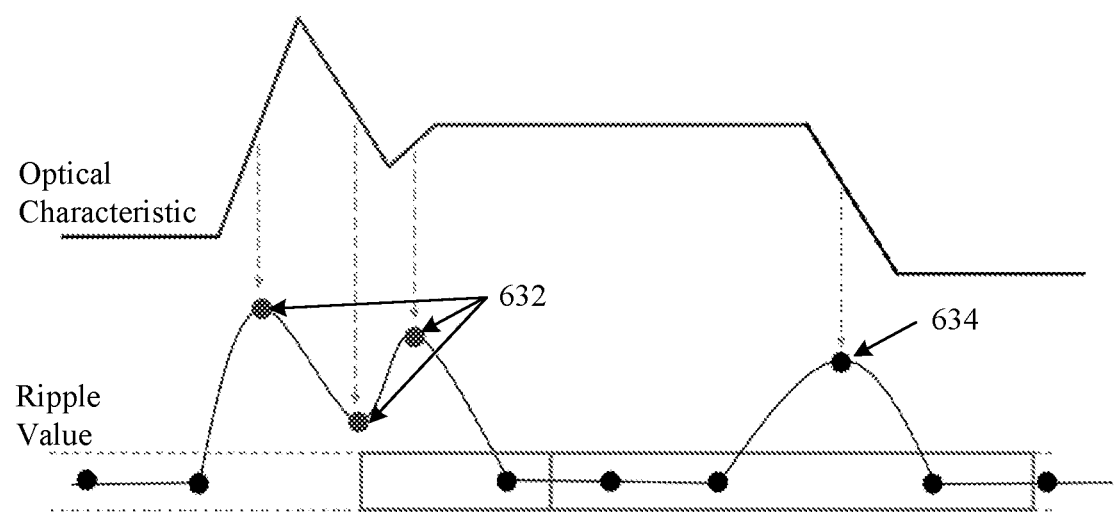
Figure 6D:
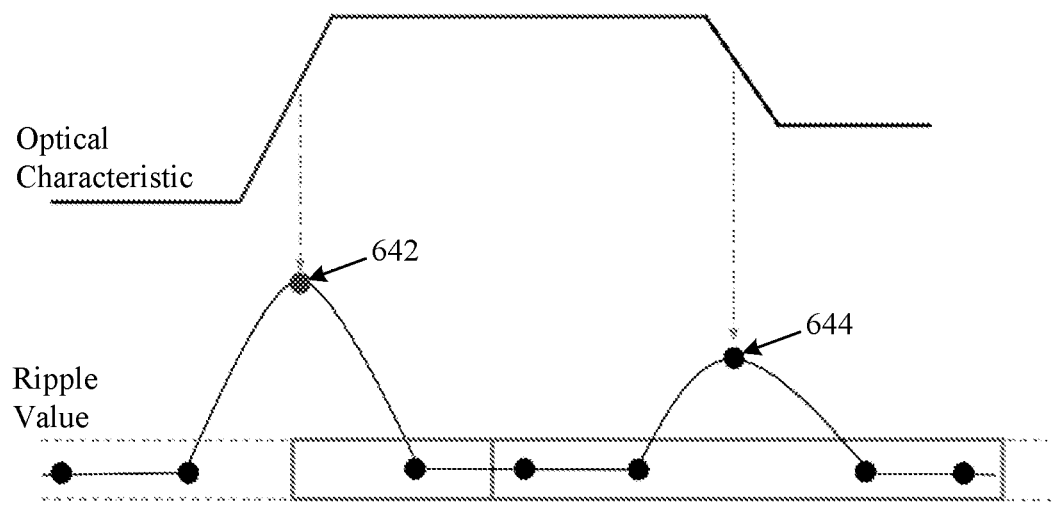

FIG. 6A, for instance, illustrates a first measurement scenario 600 that comprises an optical characteristic measurement graph 602, a ripple value graph 604, a first time window 606, a second time window 608, and a threshold ripple value 610. In examples, optical characteristic measurement graph 602 represents a graph of a plurality of optical characteristics (e.g., luminance measurements) taken by optical sensor 104 over a length of time. Similar features (with different illustrative values) are depicted in FIGS. 6B-6D. As shown in FIG. 6A, optical characteristic measurement graph 602 comprises a first lower steady state, followed by a rise with a relatively small overshoot (e.g., a transient), which is then followed by a higher second steady state. In an example, such measurements represent the measured characteristic of display 102 at a particular location (e.g., where the optical sensor 104 is positioned to capture light) as the display transitions from a first screen with a lower brightness to a second screen with a higher brightness.

In the illustration shown in FIG. 6A, various ripple values are generated, illustrated by points on ripple value graph 604. Each ripple value is generated at a periodic frequency in various embodiments, and corresponds to values in the optical characteristic graph. In FIG. 6A, the third ripple value point (i.e., the highest value shown in ripple value graph 604) is above threshold ripple value 610. In accordance with disclosed techniques, this third ripple value point activates first time window 606 during which additional ripple values are analyzed. In examples, this third ripple value point also activates second time window 608 that is shorter than first time window 606, where the second time window serves to filter out certain types of observed behaviors from being falsely identified as a visual artifact. In implementations, first time window 606 and second time window 608 are partially overlapping (e.g., first time window 606 is larger than, and includes, second time window 608).

It should also be noted that the respective lengths of each window are only illustrative. Longer and/or shorter windows are configurable (e.g., by a user) for first time window 606 and/or second time window 608 in various embodiments. In examples, the ripple value threshold is similarly configurable. In implementations, a lower threshold will be more sensitive to detecting visual artifacts, but also will be vulnerable to more false positives resulting from image transitions transients or floor noise.

For instance, in FIG. 6A, the fourth ripple value point, which represents a value associated with a decreased optical characteristic measurement following a slight overshoot, is also above threshold ripple value 610. Because both the third ripple value point and fourth ripple value point in this illustration are within the second time window 608 used for filtering out false positives, these points (collectively identified as ripple value points 612) that exceeded the threshold ripple are not necessarily identified as visual artifacts.

Accordingly, in the illustration of FIG. 6A, the scenario identified a normal image transition with some roughness (e.g., a transition with sight overshoot) and is not identified as containing a visual artifact. However, because first time window 606 is still present for monitoring additional ripple values following the third ripple value point, it is still possible that the third ripple value point could subsequently be identified as a visual artifact at a later point in time if any points within the first time window (but outside the second time window) exceeded the threshold. While this scenario is not specifically illustrated in FIG. 6A, other illustrations describe such a scenario (e.g., FIG. 6C).

FIG. 6B illustrates a second measurement scenario 620. In the second scenario, a plurality of ripple value points are identified that exceed the threshold value in the second time window. In particular, the ripple value graph comprises a ripple value 622 that initiated activation of the first and second time windows, a ripple value 624, and a ripple value 626, all of which are within the shorter second time window. In this illustration, because there is more than two ripple values in the shorter second time window (i.e., the filtering window), ripple value 622 is identified as a visual artifact. In other words, where more than two ripple values are present in the shorter time window, it is inferred that the image transition is no longer normal and the shorter time window is not used for preventing one or more of these values from being identified as a visual artifact. In contrast, in FIG. 6A, only two points were identified within the smaller time window, which resulted in a determination that a visual artifact was not present.

In this particular example, the visual artifact corresponds to ripple value 622 and is identified as a visual artifact event with a luminance ramp-up. Ripple value 624 and ripple value 626, however, are not identified as visual artifacts in this particular illustration, since those two events occurred within the shorter filtering window and no further events followed those events in the larger time window that exceeded the threshold. Accordingly, ripple value 624 and ripple value 626 are identified as a normal image transition with a small/tolerable undershoot.

It should be noted, however, that the number of points is only intended to illustrate the operation of the detection and filtering, and is not intended to be limiting. For instance, VA detection system 110 could be configured such that a larger number of ripple values exceeding the ripple value threshold (e.g., depending on the frequency at which the points are generated or the desired sensitivity) exceeding the second time window is acceptable (i.e., not indicative of a visual artifact). In other words, any desired number of points within the shorter time window are selectable as a threshold above which the shorter time window is no longer used to filter out events from being classified as visual artifact. In some other implementations, the second time window is eliminated altogether, such that no filtering is utilized.

FIG. 6C illustrates a third measurement scenario 630. The third measurement scenario illustrated in FIG. 6C is similar to the measurement scenario of FIG. 6B, except with an additional ripple value 634 that exceeds the threshold outside of the second time window. In this scenario, ripple value 634 is still within the larger first time window. Accordingly, because of the details provided above with respect to FIG. 6C and the additional ripple value 634 that exceeded the threshold at a later point in time in the larger time window, each of ripple values 632 represent visual artifacts (or a single visual artifact event, collectively). In this particular illustration, the visual artifacts represent a luminance ramp-up and brightness dip, which often corresponds to a flickering behavior observed on a display. In some implementations, the visual artifact event is identified as comprising the length of time between the first value of ripple values 632 and ripple value 634.

FIG. 6D illustrates a fourth measurement scenario 640. The fourth measurement scenario comprises a ripple value 642 and a ripple value 644 that exceed the threshold ripple value. In the illustration of FIG. 6D, no ripple values were identified as exceeding the threshold ripple value within the second time window. However, ripple value 644 exceeded the threshold window within the first time window that was activated at a time associated with ripple value 642. As a result, ripple value 642 is identified as a visual artifact, and the visual artifact event period comprise the time between ripple value 642 and ripple value 644 in this example. In this particular example, ripple value 644 is not identified as a visual artifact, unless a further ripple value (not shown) exceeding the threshold follows ripple value 644 in the first time window.

Figure 7A:
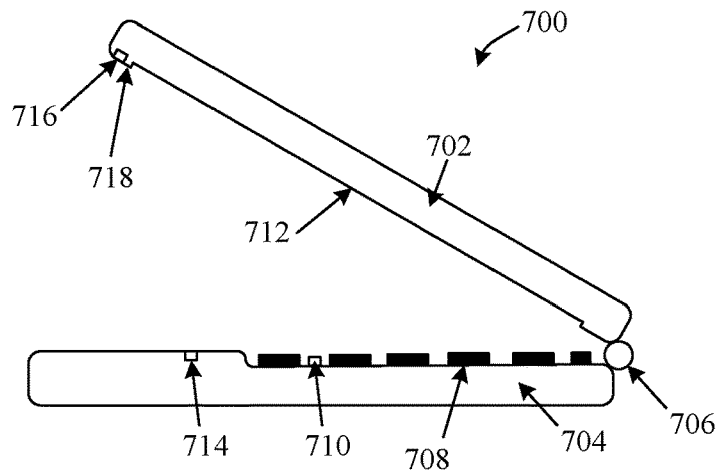
FIGS. 7A-7C illustrate a computing device that contains a plurality of optical sensors used for measuring an optical characteristic of a display, in accordance with an example embodiment.
Figure 7B:
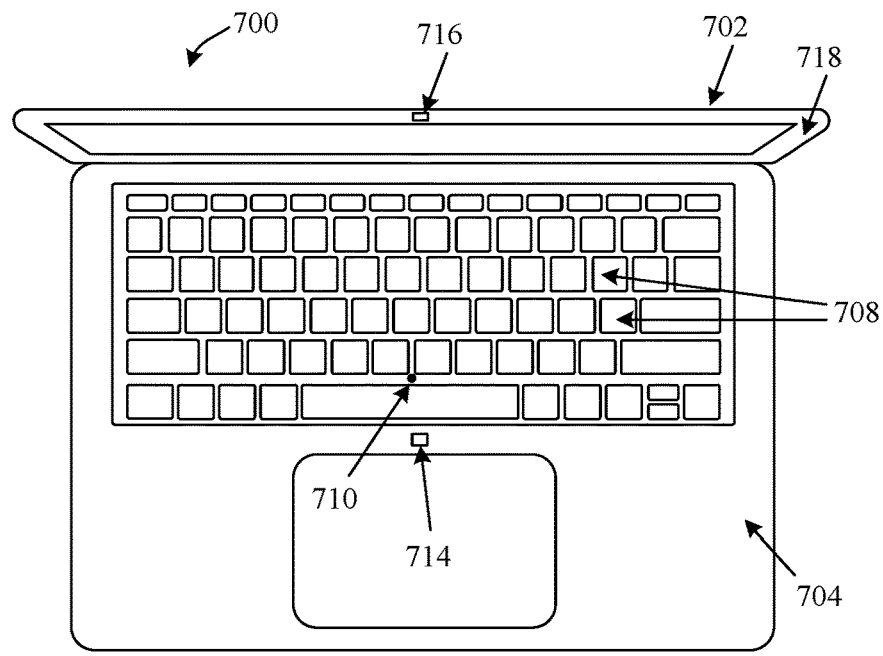
Figure 7C:
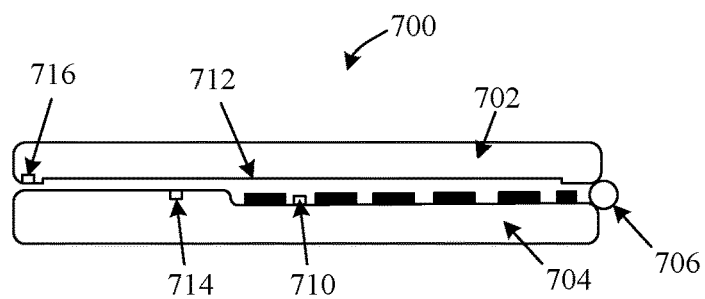

In various implementations, optical sensor 104 is physically a part of computing device 106 (e.g., a hardware component that is installed and/or integral to a housing thereof). For instance, FIGS. 7A-7C illustrate a computing device that contains a plurality of optical sensors used for measuring an optical characteristic of a display. The configuration of the computing device shown in FIGS. 7A-7C is only illustrative, and other configurations (e.g., tablets, desktops, etc.) are also possible for implementing the disclosed techniques.

In FIG. 7A, a first orientation of a computing device 700 is shown in which the computing device is in a partially open state. FIG. 7B depicts computing device 700 in an open orientation. FIG. 7C depicts computing device 700 in a closed orientation. Computing device 700 comprises a display portion 702 and a base portion 704 that are movably attached to each other (e.g., rotatable with respect to each other) via a hinge point 706. Display portion 702 comprises a display 712 (which is an example implementation of display 102), a front sensor 716, and a display bezel 718. In examples, display bezel 718 comprises a portion of display portion 702 that surrounds a periphery of display 712 and is in a plane that is parallel to a plane of display 712. In examples, display bezel 718 houses front sensor 716 (e.g., front sensor 716 is installed within and/or is integral with display bezel 718). Front sensor 716 includes one or more light-capturing sensors (e.g., optical sensor 104). In one implementation, front sensor 716 includes a camera and/or an ambient light sensor.

Base portion 704 comprises a keyboard with keyboard keys 708, an optical sensor 710, and an optical sensor 714. Optical sensor 710 and optical sensor 714 are example implementations of optical sensor 104 and are embedded and/or housed in base portion 704. In FIGS. 7A-7C, optical sensor 710 is positioned and/or installed in a housing of base portion 704 such that optical sensor 710 is between and/or surrounded by one or more keys of the keyboard. For example, as shown in FIG. 7B, optical sensor 710 is surrounded such that at least a portion of one or more keyboard keys are above and below the sensor. In another example, optical sensor 710 is positioned such that at least a portion of one or more keyboard keys are to the left and/or right of the sensor. In yet another example, optical sensor is positioned such that one or more keyboard keys are adjacent to any portion of the periphery of the sensor. In one implementation, optical sensor 710 is positioned such that is in a location of the keyboard area that is near the center of display 712 when computing device 700 is in a closed orientation. In various examples, optical sensor 710 is positioned such that an exposed surface (e.g., an upper surface that opposed display 712 when display is closed as seen in FIG. 7C) is below an upper surface keyboard keys 708. In other words, optical sensor 710 is positioned such that it is recessed relative to keyboard keys 708 in some examples.

Optical sensor 714 is similarly positioned and/or installed in a housing of base portion 704. Optical sensor 714, as shown in FIGS. 7A-7C, is housed outside of a keyboard portion, but still in an area of base portion 704 such that optical sensor 710 is able to capture light emitted from display 712 (e.g., when computing device is in close or partially open orientation). Positioning optical sensor 710, optical sensor 714, and/or front sensor 716 within and/or integral to computing device 700 allows for utilization of communication channels (e.g., a system bus) internal to computing device, rather external communication channels such as wired or wireless connections which are often slower and can be unreliable due to faulty and/or weak connections. By embedding sensors in computing device 700 in a manner that utilizes faster and more reliable communication channels, optical characteristic measurements can be captured faster with reduced or no data loss.

In examples, any one or more of optical sensor 710, optical sensor 714, and front sensor 716 are used by VA detection system 110 to detect visual artifacts, in accordance with disclosed techniques. In one example, such as in a partially closed orientation (e.g., in FIG. 7A), front sensor is configured to capture light from display 712 that is reflected off base portion 704. In another example, front sensor 716, optical sensor 710, and/or optical sensor 710 are configured to capture light from display 712 in various orientations (e.g., in partially open orientation and/or a closed orientation). In yet another example, any combination of the sensors are used to capture light from display 712.

Although not illustrated herein, computing device 700 can contain any more or less than the components shown in FIGS. 7A-7C. In some examples, computing device 700 contains only a single one of the sensors shown (e.g., one of optical sensor 710, optical sensor 714, and front sensor 716), or contains any additional number of sensors not illustrated (e.g., multiple sensors within the keyboard area of the base portion). In addition, the sensors are arrangeable in any location, and is not limited to the illustrative placement shown in FIGS. 7A-7C.

Figure 8A:
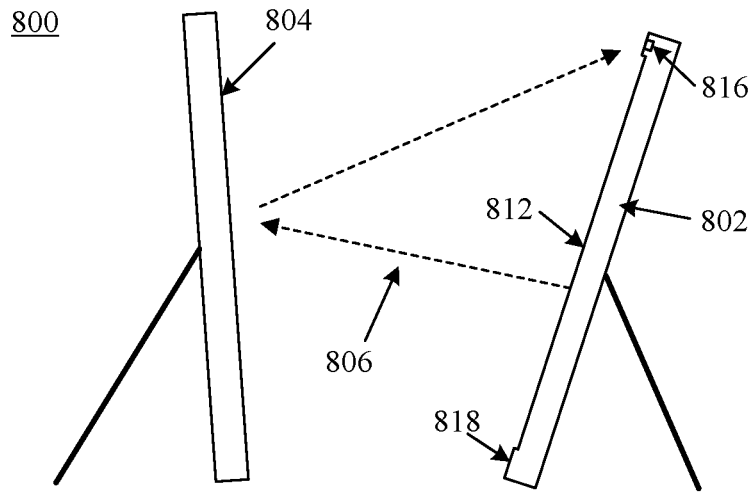
FIGS. 8A-8C illustrate various computing device configurations for measuring an optical characteristic of a display, in accordance with various example embodiments.
Figure 8B:
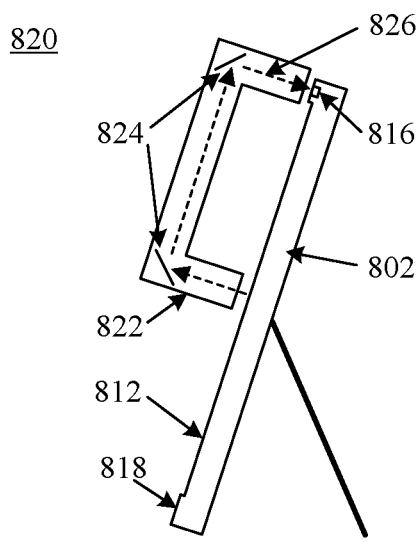
Figure 8C:
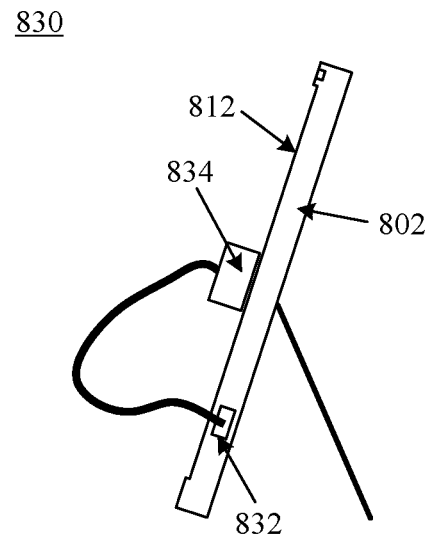

FIGS. 8A-8C illustrate various other computing device configurations for measuring an optical characteristic of a display. The configurations shown in FIGS. 8A-8C are only illustrative, and other configurations using different types of computing devices and/or hardware are also contemplated (e.g., desktop computers with separate monitors, laptop computers, smartphones, etc.). In FIG. 8A, a first light capturing configuration 800 is shown comprising a computing device 802 and a reflective unit 804. Computing device 802 is an example implementation of computing device 106. In examples, computing device 802 is a tablet computing device with a display 812 on a front surface thereof. Computing device 802 also comprises a front sensor 816 and display bezel 818 that houses front sensor 816. In examples, display 812, front sensor 816, and display bezel 818 are similar to display 712, front sensor 716, and display bezel 818. Reflective unit 804 comprises a material that is configured to reflect light, such as a mirror, foil, glass, etc. While reflective unit 804 is illustrated as being a portable unit, reflective unit 804 is permanent in other examples (e.g., mounted to a surface, such as a wall).

In implementations, computing device 802 and reflective unit 804 are positioned relative to each other such that at least a portion of light 806 emitted from display 812 is directed towards reflective unit 804, and reflected back towards front sensor 816. In this manner, front sensor 816 that is housed within a display bezel portion of computing device 802 is used to measure optical characteristics of display 812. Such an arrangement (as well as other arrangements described herein) enables optical characteristic measurements to be obtained in environments where ambient light is low (e.g., dark environments), in order to reduce the amount of light from other unrelated sources entering the sensor. Further, as discussed earlier with respect to computing device 700, housing front sensor 816 within computing device 802 can improve the speed and reliability of capturing optical characteristic measurements from the display, which can further enhance the visual artifact detection performance.

FIG. 8B illustrates another example configuration 820 for measuring an optical characteristic of a display. In FIG. 8B, computing device 802 similarly comprises display 812 and front sensor 816 housed within display bezel 818. The configuration in FIG. 8B also comprises a light redirecting unit 822 for redirecting a light path 826 (e.g., from which an optical characteristic is measured) from one location to another location. As shown in FIG. 8B, light redirecting unit 822 comprises two reflective surfaces 824, such as mirrors, for redirecting light path 826. Although not shown, light redirecting unit 822 can also comprise one or more additional components that affect the redirection of light, such as lenses, filters, etc. In some examples, light redirecting unit 822 is a periscope for redirecting a light path. In other examples, light redirecting unit 822 does not comprise reflecting surfaces, but contains one or more other components for redirecting a light path, such as an optical fiber.

As shown in FIG. 8B, light redirecting unit 822 is positioned such that one end is placed over display 812 and another end is placed over front sensor 816. In this manner, at least a portion of light from display 812 is redirected to front sensor 816 such that optical characteristic measurements are obtained by front sensor 816. In examples, light redirecting unit is temporarily affixed computing device 802 in various ways, such as with suction cups, hook-and-loop fasteners, removable adhesive (including removable adhesive tape), clips, etc.

FIG. 8C illustrates another example configuration 830 for measuring an optical characteristic of a display. In FIG. 8C, computing device 802 similarly comprises display 812. Computing device 802, as shown in FIG. 8C, also comprises a port 832, such as a USB port, for connecting external peripheral devices. In the example of FIG. 8C, port 832 is connected to an external optical sensor 834 (e.g., a photosensor or photodiode, a camera, a color meter, etc.) that is able to be temporarily positioned (e.g., similar to light redirecting unit 822) at a desired location of display 812 that is coupled to computing device 802, such that external optical sensor 834 captures light from display 812 from which optical characteristic measurements are made in accordance with the disclosed techniques.

While the foregoing arrangements have been described for measuring an optical characteristic of a display of a computing device, these arrangements are not intended to be limiting, and various other arrangements are possible and within the scope of this disclosure. In embodiments, any one or more of the foregoing techniques are used to identify visual artifacts on a display of a computing device in various product development and/or post-release stages. In one example, such as after a computing device and/or display are manufactured but before the product has been released, one or more external sensors are attachable to one or more locations of a display (e.g., as shown in FIG. 8C) and a test application can be triggered on the computing device coupled to the display (or another separate computing device) to identify of any visual artifacts that may be present on the display. In another example, one or more computing devices in a post-production setting perform a self-diagnostic test based on a testing application executing therein using any of the foregoing techniques (e.g., testing the display as shown in FIGS. 7A-7C).

In yet another example, testing is carried out by a purchaser (e.g., an end-user) of the computing device, such as by executing a testing application that triggers the collection and/or analysis of optical characteristic measurements. For instance, as shown in FIGS. 7A-7C, the computing device can comprise testing software, that when executed, automatically performs various types of visual artifact testing (e.g., power cycling, stress testing, etc.) using one or more sensors that are integrated into the computing device itself. In another implementation, such testing is carried out automatically (e.g., without user input), such as during times of non-use of the computing device (e.g., during nights, weekends, etc.). In yet another implementation, the testing software directs the user to position the computing device a certain way (e.g., any of the positions as shown in FIGS. 7A-7C), while the testing software performs the test (e.g., projecting test images even when the lid of a laptop is closed). In yet another implementation, the testing software directs the user to position one or more external devices (e.g., as shown in FIGS. 8A-8C) to enable light from a display to be redirected to and/or captured by a sensor of the computing device, thereby enabling the sensor to capture the appropriate measurements to improve the quality of the display. These are only illustrative, and any combination of the techniques disclosed herein can be used at various stages (e.g., after manufacturing, after being purchased, etc.), with or without user assistance and/or user input.

In various embodiments, test application 316 is executed to manage the testing of a display device to identify visual artifacts therein. In implementations, test application 316 is triggered to test a display as described herein automatically or manually. For instance, the test application can cause visual artifact testing to take place in response to identifying a hardware and/or software change (e.g., installation of a new application) on computing device 106 that potentially affects the manner in which display 102 projects images, based on a schedule or routine (e.g., testing each day or week), and/or in response to a user input. In various embodiments, test application 316 is used for self-diagnostics and/or self-calibration of computing device 106 and/or display 102 to identify and/or remediate identified visual artifacts.

Test application 316 operates in various ways to manage the testing of a display device. In examples, test application 316 is configured with various settings and/or test sequences. Such settings include, but are not limited to, the length of the first and second time windows and/or threshold ripple value (which can be configured by a user, automatically, or predetermined) based on each test sequence. In some implementations, the settings can specify whether the second time window (i.e., used for filtering as described above) should be enabled or disabled during a test sequence (such as where the test sequence comprises projecting a single image with no image transitions). Test sequences include an identification of one or more test procedures that are to be carried out. In one example, the test procedure comprises providing a signal to the display driver to project a particular image or transition between a plurality of images (e.g., a sweep of test images) while optical characteristic measurements are obtained. In another example, the test procedure comprises changing the brightness of the display (e.g., a brightness sweep) during projection of a still image while optical characteristic measurements are obtained. In another example, the test procedure comprises a moving picture (e.g., a video) that is caused to be projected on the display device along with a predetermined still image (e.g., a box with a certain color or image that stays constant), while optical characteristic measurements are obtained for at least the predetermined still image. This type of testing allows for display components (e.g., a graphics module) to be stressed due to the video playback in order to observe whether such stressing is causing unintended visual artifacts.

In another example, the test procedure comprises a signal to cause the computing device coupled to the display to perform a plurality of power cycles (i.e., complete powering down and powering up during which many visual artifacts are present) while optical characteristic measurements are obtained during the power cycling process. For instance, in the power cycling process, various components of the computing device and/or display are power cycled, such as the display panel, display driver components, backlight, etc. In addition, the power cycle causes the display to cycle through a series of different image transitions (e.g., an ON image, a sign-in page, a desktop image, and optionally one or more test images and/or brightness sweeps). It should be noted that while some implementations described herein comprise testing a display using predetermined images (e.g., based on a test sequence), predetermined images are not necessary for operation. Instead, visual artifacts can be identified in accordance with the disclosed techniques based on transitioning from any two images (e.g., during a power cycle), even if those images are not previously known by the test sequence. In other examples, test application 316 is running in the background of an operating system and is configured to perform testing during normal use of the computing device, while obtaining optical characteristic measurements using hardware integral to the computing device.

While optical characteristic measurements are obtained, VA detection system 110 analyses such measurements as described herein to generate ripple values and determine whether visual artifact events are present during the test sequence. If additional test sequences are to be executed, additional iterations are performed for those additional sequences (i.e., executing the sequence, collecting measurements, and determining whether visual artifacts were present). If a visual artifact event is identified, the test flow can be optionally paused and various controls and/or adjustments can be made as described herein to alter the manner in which display 102 projects images. In some implementations, pausing the test flow due to the presence of a visual artifact also comprises triggering various other devices or components (e.g., an oscilloscope, multimeter, other hardware components, software components, etc.) to trigger data collection of additional data (e.g., optical data, electrical data, operating system information, etc.) in real-time to aid in determining a root cause, and possible remediation actions, of the visual artifact. After such adjustments are made, the test flow resumes and further data collection and analysis is performed.

During the test flow or following completion thereof, test application 316 generates test report 318 in some embodiments that identifies the results of the visual artifact testing. In examples, test report 318 includes information such as an identification of each test sequence, whether a visual artifact was identified during a test sequence, a time of the identified visual artifact, a location of the identified visual artifact, a mechanism of the malfunction, optical characteristic measurements associated with the visual artifact, adjustments made following the identification of the visual artifact, computing component parameters (e.g., voltage levels, battery levels, hardware and/or software states, etc.) at the time of the visual artifact, whether the visual artifact reoccurred following the adjustment, or any other information associated with the testing and/or remediation of visual artifacts. In examples, test report 318 is stored on computing device 106 and is optionally viewable by a user. In some implementations, test report 318 is displayed concurrently (e.g., in real-time) while a test flow is in process, such that a user may view real-time data regarding the measuring and/or processing of the optical characteristic measurements and any visual artifacts identified.

III. Example Mobile Device and Computer System Implementation

Each of display 102, optical sensor 104, computing device 106, sensor driver 108, VA detection system 110, display driver 112, optical characteristic analyzer 304, VA detector 308, VA detection manager 310, display adjuster 312, test application 316, components of computing device 700, components of computing device 802, and/or each of the steps of flowcharts 200, 400, and/or 500 may be implemented in hardware, or hardware combined with software and/or firmware. For example, display 102, optical sensor 104, computing device 106, sensor driver 108, VA detection system 110, display driver 112, optical characteristic analyzer 304, VA detector 308, VA detection manager 310, display adjuster 312, test application 316, components of computing device 700, components of computing device 802, and/or the steps of flowcharts 200, 400, and/or 500 may be implemented as computer program code (e.g., instructions in a programming language) configured to be executed in one or more processors and stored in a computer readable storage medium. Alternatively, display 102, optical sensor 104, computing device 106, sensor driver 108, VA detection system 110, display driver 112, optical characteristic analyzer 304, VA detector 308, VA detection manager 310, display adjuster 312, test application 316, components of computing device 700, components of computing device 802, and/or each of the steps of flowcharts 200, 400, and/or 500 may be implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
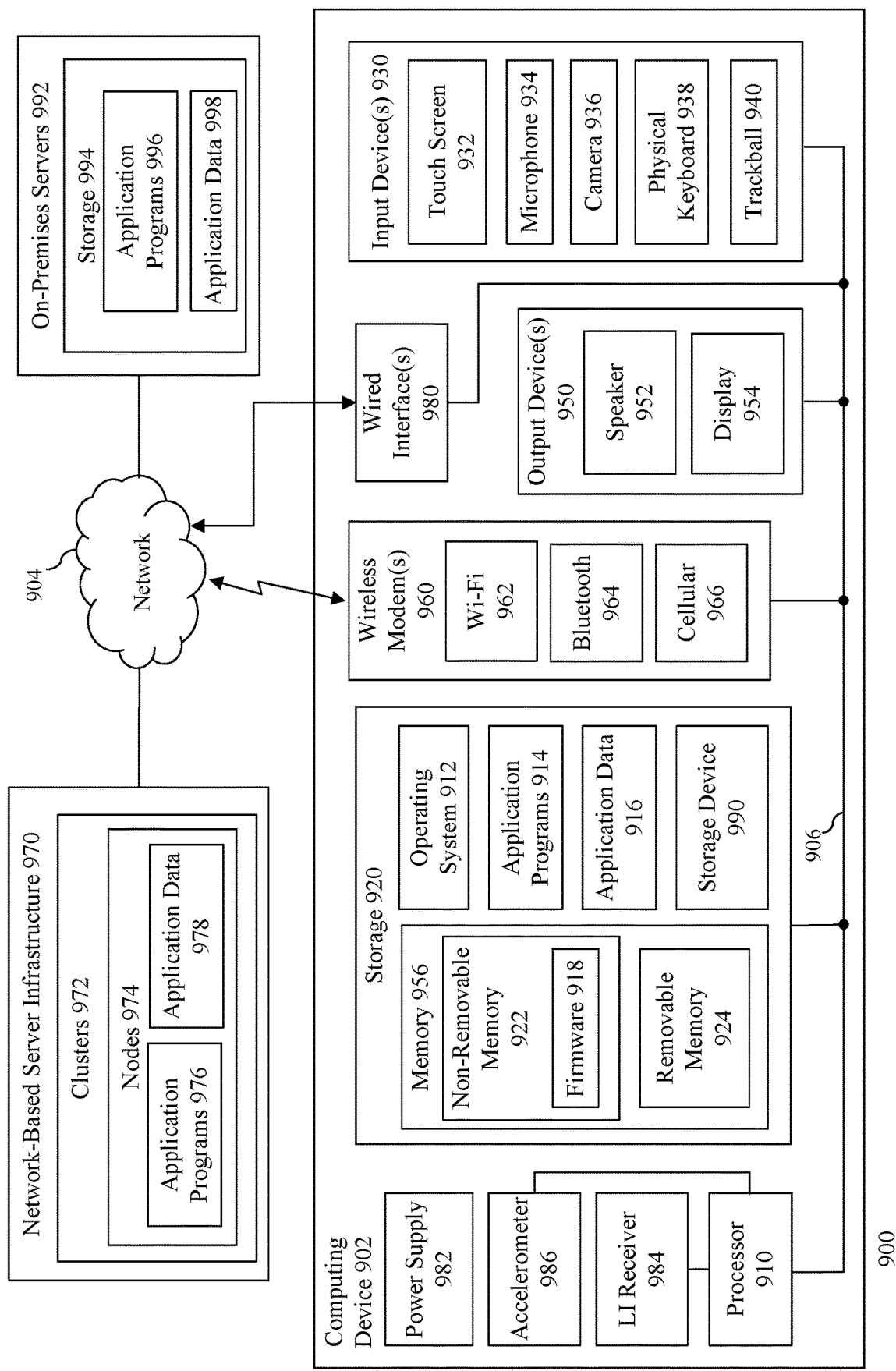
FIG. 9 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 9. FIG. 9 shows a block diagram of an exemplary computing environment 900 that includes a computing device 902, a network-based server infrastructure 970, and an on-premises servers 992.

As shown in FIG. 9, computing device 902, network-based server infrastructure 970, and on-premises storage 992 are communicatively coupled via network 904. Network 904 comprises one or more networks such as local area networks (LANs), wide area networks (WANs), enterprise networks, the Internet, etc., and may include one or more wired and/or wireless portions. Network 904 may additional or alternatively include a cellular network for cellular communications.

Embodiments described herein may be implemented in one or more of computing device 902, network-based server infrastructure 970, and on-premises servers 992. For example, in some embodiments, computing device 902 may be used to implement systems, clients, or devices, or components/subcomponents thereof, disclosed elsewhere herein. In other embodiments, a combination of computing device 902, network-based server infrastructure 970, and/or on-premises servers 992 may be used to implement the systems, clients, or devices, or components/subcomponents thereof, disclosed elsewhere herein. Computing device 902, network-based server infrastructure 970, and on-premises storage 992 are described in detail as follows.

Computing device 902 can be any of a variety of types of computing devices. For example, computing device 902 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 902 may alternatively be a stationary computing device such as a desktop computer, a personal computer (PC), a stationary server device, a minicomputer, a mainframe, a supercomputer, etc.

As shown in FIG. 9, computing device 902 includes a variety of hardware and software components, including a processor 910, a storage 920, one or more input devices 930, one or more output devices 950, one or more wireless modems 960, one or more wired interface(s) 980, a power supply 982, a location information (LI) receiver 984, and an accelerometer 986. Storage 920 includes memory 956, which includes non-removable memory 922 and removable memory 924, and a storage device 990. Storage 920 also stores an operating system 912, application programs 914, and application data 916. Wireless modem(s) 960 include a Wi-Fi modem 962, a Bluetooth modem 964, and a cellular modem 966. Output device(s) 950 includes a speaker 952 and a display 954. Input device(s) 930 includes a touch screen 932, a microphone 934, a camera 936, a physical keyboard 938, and a trackball 940. Not all components of computing device 902 shown in FIG. 9 are present in all embodiments, additional components not shown may be present, and any combination of the components may be present in a particular embodiment. These components of computing device 902 are described as follows.

A single processor 910 (e.g., central processing unit (CPU), microcontroller, a microprocessor, signal processor, ASIC (application specific integrated circuit), and/or other physical hardware processor circuit) or multiple processors 910 may be present in computing device 902 for performing such tasks as program execution, signal coding, data processing, input/output processing, power control, and/or other functions. Processor 910 may be a single-core or multi-core processor, and each processor core may be single-threaded or multithreaded (to provide multiple threads of execution concurrently). Processor 910 is configured to execute program code stored in a computer readable medium, such as program code of operating system 912 and application programs 914 stored in storage 920. Operating system 912 controls the allocation and usage of the components of computing device 902 and provides support for one or more application programs 914 (also referred to as "applications" or "apps"). Application programs 914 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 902 can communicate with any other component according to function, although not all connections are shown for ease of illustration. For instance, as shown in FIG. 9, bus 906 is a multiple signal line communication medium (e.g., conductive traces in silicon, metal traces along a motherboard, wires, etc.) that may be present to communicatively couple processor 910 to various other components of computing device 902, although in other embodiments, an alternative bus, further busses, and/or one or more individual signal lines may be present to communicatively couple components. Bus 906 represents one or more of any of several types of bus structures, including a memory bus or memory controller, a peripheral bus, an accelerated graphics port, and a processor or local bus using any of a variety of bus architectures.

Storage 920 is physical storage that includes one or both of memory 956 and storage device 990, which store operating system 912, application programs 914, and application data 916 according to any distribution. Non-removable memory 922 includes one or more of RAM (random access memory), ROM (read only memory), flash memory, a hard disk (e.g., a magnetic disk drive for reading from and writing to a hard disk), and/or other physical memory device type. Non-removable memory 922 may include main memory and may be separate from or fabricated in a same integrated circuit as processor 910. As shown in FIG. 9, non-removable memory 922 stores firmware 918, which may be present to provide low-level control of hardware. Examples of firmware 918 include BIOS (Basic Input/Output System, such as on personal computers) and boot firmware (e.g., on smart phones). Removable memory 924 may be inserted into a receptacle of or otherwise coupled to computing device 902 and can be removed by a user from computing device 902. Removable memory 924 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 990 may be present that are internal and/or external to a housing of computing device 902 and may or may not be removable. Examples of storage device 990 include a hard disk drive, a solid-state drive (SSD), a thumb drive (e.g., a USB (Universal Serial Bus) flash drive), or other physical storage device.

One or more programs may be stored in storage 920. Such programs include operating system 912, one or more application programs 914, and other program modules and program data. Examples of such application programs may include, for example, computer program logic (e.g., computer program code/instructions) for implementing one or more of, sensor driver 108, VA detection system 110, display driver 112, optical characteristic analyzer 304, VA detector 308, VA detection manager 310, display adjuster 312, test application 316, components of computing device 700, components of computing device 802, along with any components and/or subcomponents thereof, as well as the flowcharts/flow diagrams (e.g., flowcharts 200, 400, and/or 500) described herein, including portions thereof, and/or further examples described herein.

Storage 920 also stores data used and/or generated by operating system 912 and application programs 914 as application data 916. Examples of application data 916 include web pages, text, images, tables, sound files, video data, and other data, which may also be sent to and/or received from one or more network servers or other devices via one or more wired or wireless networks. Storage 920 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 902 through one or more input devices 930 and may receive information from computing device 902 through one or more output devices 950. Input device(s) 930 may include one or more of touch screen 932, microphone 934, camera 936, physical keyboard 938 and/or trackball 940 and output device(s) 950 may include one or more of speaker 952 and display 954. Each of input device(s) 930 and output device(s) 950 may be integral to computing device 902 (e.g., built into a housing of computing device 902) or external to computing device 902 (e.g., communicatively coupled wired or wirelessly to computing device 902 via wired interface(s) 980 and/or wireless modem(s) 960). Further input devices 930 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 954 may display information, as well as operating as touch screen 932 by receiving user commands and/or other information (e.g., by touch, finger gestures, virtual keyboard, etc.) as a user interface. Any number of each type of input device(s) 930 and output device(s) 950 may be present, including multiple microphones 934, multiple cameras 936, multiple speakers 952, and/or multiple displays 954.

One or more wireless modems 960 can be coupled to antenna(s) (not shown) of computing device 902 and can support two-way communications between processor 910 and devices external to computing device 902 through network 904, as would be understood to persons skilled in the relevant art(s). Wireless modem 960 is shown generically and can include a cellular modem 966 for communicating with one or more cellular networks, such as a GSM network for data and voice communications within a single cellular network, between cellular networks, or between the mobile device and a public switched telephone network (PSTN). Wireless modem 960 may also or alternatively include other radio-based modem types, such as a Bluetooth modem 964 (also referred to as a "Bluetooth device") and/or Wi-Fi 962 modem (also referred to as an "wireless adaptor"). Wi-Fi modem 962 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 864 is configured to communicate with another Bluetooth-capable device according to the Bluetooth short-range wireless technology standard(s) such as IEEE 802.15.1 and/or managed by the Bluetooth Special Interest Group (SIG).

Computing device 902 can further include power supply 982, LI receiver 984, accelerometer 986, and/or one or more wired interfaces 980. Example wired interfaces 980 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 980 of computing device 902 provide for wired connections between computing device 902 and network 904, or between computing device 902 and one or more devices/peripherals when such devices/peripherals are external to computing device 902 (e.g., a pointing device, display 954, speaker 952, camera 936, physical keyboard 938, etc.). Power supply 982 is configured to supply power to each of the components of computing device 902 and may receive power from a battery internal to computing device 902, and/or from a power cord plugged into a power port of computing device 902 (e.g., a USB port, an A/C power port). LI receiver 984 may be used for location determination of computing device 902 and may include a satellite navigation receiver such as a Global Positioning System (GPS) receiver or may include other type of location determiner configured to determine location of computing device 902 based on received information (e.g., using cell tower triangulation, etc.). Accelerometer 986 may be present to determine an orientation of computing device 902.

Note that the illustrated components of computing device 902 are not required or all-inclusive, and fewer or greater numbers of components may be present as would be recognized by one skilled in the art. For example, computing device 902 may also include one or more of a gyroscope, barometer, proximity sensor, ambient light sensor, digital compass, etc. Processor 910 and memory 956 may be co-located in a same semiconductor device package, such as being included together in an integrated circuit chip, FPGA, or system-on-chip (SOC), optionally along with further components of computing device 902.

In embodiments, computing device 902 is configured to implement any of the above-described features of flowcharts herein. Computer program logic for performing any of the operations, steps, and/or functions described herein may be stored in storage 920 and executed by processor 910.

In some embodiments, server infrastructure 970 may be present. Server infrastructure 970 may be a network-accessible server set (e.g., a cloud-based environment or platform). As shown in FIG. 9, server infrastructure 970 includes clusters 972. Each of clusters 972 may comprise a group of one or more compute nodes and/or a group of one or more storage nodes. For example, as shown in FIG. 9, cluster 972 includes nodes 974. Each of nodes 974 are accessible via network 904 (e.g., in a "cloud-based" embodiment) to build, deploy, and manage applications and services. Any of nodes 974 may be a storage node that comprises a plurality of physical storage disks, SSDs, and/or other physical storage devices that are accessible via network 904 and are configured to store data associated with the applications and services managed by nodes 974. For example, as shown in FIG. 9, nodes 974 may store application data 978.

Each of nodes 974 may, as a compute node, comprise one or more server computers, server systems, and/or computing devices. For instance, a node 974 may include one or more of the components of computing device 902 disclosed herein. Each of nodes 974 may be configured to execute one or more software applications (or "applications") and/or services and/or manage hardware resources (e.g., processors, memory, etc.), which may be utilized by users (e.g., customers) of the network-accessible server set. For example, as shown in FIG. 9, nodes 974 may operate application programs 976. In an implementation, a node of nodes 974 may operate or comprise one or more virtual machines, with each virtual machine emulating a system architecture (e.g., an operating system), in an isolated manner, upon which applications such as application programs 976 may be executed.

In an embodiment, one or more of clusters 972 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 972 may be a datacenter in a distributed collection of datacenters. In embodiments, exemplary computing environment 900 comprises part of a cloud-based platform such as Amazon Web Services® of Amazon Web Services, Inc. or Google Cloud Platform™ of Google LLC, although these are only examples and are not intended to be limiting.

In an embodiment, computing device 902 may access application programs 976 for execution in any manner, such as by a client application and/or a browser at computing device 902. Example browsers include Microsoft Edge® by Microsoft Corp. of Redmond, Wash., Mozilla Firefox®, by Mozilla Corp. of Mountain View, Calif., Safari®, by Apple Inc. of Cupertino, Calif., and Google® Chrome by Google LLC of Mountain View, Calif.

For purposes of network (e.g., cloud) backup and data security, computing device 902 may additionally and/or alternatively synchronize copies of application programs 914 and/or application data 916 to be stored at network-based server infrastructure 970 as application programs 976 and/or application data 978. For instance, operating system 912 and/or application programs 914 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 920 at network-based server infrastructure 970.

In some embodiments, on-premises servers 992 may be present. On-premises servers 992 are hosted within an organization's infrastructure and, in many cases, physically onsite of a facility of that organization. On-premises servers 992 are controlled, administered, and maintained by IT (Information Technology) personnel of the organization or an IT partner to the organization. Application data 998 may be shared by on-premises servers 992 between computing devices of the organization, including computing device 902 (when part of an organization) through a local network of the organization, and/or through further networks accessible to the organization (including the Internet). Furthermore, on-premises servers 992 may serve applications such as application programs 996 to the computing devices of the organization, including computing device 902. Accordingly, on-premises servers 992 may include storage 994 (which includes one or more physical storage devices such as storage disks and/or SSDs) for storage of application programs 996 and application data 998 and may include one or more processors for execution of application programs 996. Still further, computing device 902 may be configured to synchronize copies of application programs 914 and/or application data 916 for backup storage at on-premises servers 992 as application programs 996 and/or application data 998.

As used herein, the terms "computer program medium," "computer-readable medium," and "computer-readable storage medium," etc., are used to refer to physical hardware media. Examples of such physical hardware media include any hard disk, magnetic disk, optical disk, other physical hardware media such as RAMs, ROMs, flash memory, digital video disks, zip disks, MEMs (microelectronic machine) memory, nanotechnology-based storage devices, and further types of physical/tangible hardware storage media of storage 920. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 914) may be stored in storage 920. Such computer programs may also be received via wired interface(s) 980 and/or wireless modem(s) 960 over network 904. Such computer programs, when executed or loaded by an application, enable computing device 902 to implement features of embodiments discussed herein. Accordingly, such computer programs represent controllers of the computing device 902.

Embodiments are also directed to computer program products comprising computer code or instructions stored on any computer-readable medium or computer-readable storage medium. Such computer program products include the physical storage of storage 920 as well as further physical storage types.

IV. Additional Example Embodiments

A system for detecting visual artifacts in a display is disclosed herein. The system comprises: a processor circuit; and a memory that stores program code that is executed by the processor circuit to cause the system to: obtain a sequence of optical characteristic measurements for at least a portion of the display using an optical sensor, each optical characteristic measurement capturing an optical characteristic of the display at a different time in the sequence; generate a plurality of ripple values based at least on the sequence of optical characteristic measurements, each ripple value indicative of a change of the optical characteristic over a period of time; identify a first ripple value of the plurality of ripple values that exceeds a threshold ripple value; determine whether a second ripple value of the plurality of ripple values exceeds the threshold ripple value in a first time window, the first time window commencing at a time associated with the first ripple value; in response to a determination that the second ripple value exceeds the threshold ripple value, determine that the first ripple value corresponds to a visual artifact; and generate a visual artifact indication in response to a determination that the first ripple value corresponds to a visual artifact.

In one implementation of the foregoing system, the visual artifact comprises one of a: flashing, shading, flickering, sparkling, scrambling, shifting, juddering, or shut down of one or more pixels.

In another implementation of the foregoing system, the program code, when executed by the processor circuit, further causes the system to: identify a third ripple value of the plurality of ripple values that exceeds the threshold ripple value; identify a fourth ripple value of the plurality of ripple values that exceeds the threshold ripple value, the third ripple value and fourth ripple value being within a second time window that has a length shorter than the first time window; and determine that the third ripple value does not correspond to a visual artifact.

In another implementation of the foregoing system, the visual artifact indication comprises at least one of: a notification presented in a user interface identifying the visual artifact, or a calibration signal to a computing component for altering an output provided to the display.

In another implementation of the foregoing system, the optical sensor is housed in a base portion of a computing device that comprises the display, the base portion being movably attached to the display.

In another implementation of the foregoing system, the optical sensor is housed in a display bezel of a computing device, the display bezel being in a plane parallel to the display.

In another implementation of the foregoing system, the optical sensor is externally connected to a computing device coupled to the display.

A method for detecting visual artifacts in a display is disclosed herein. The method comprises: obtaining a sequence of optical characteristic measurements for at least a portion of the display using an optical sensor, each optical characteristic measurement capturing an optical characteristic of the display at a different time in the sequence; generating a plurality of ripple values based at least on the sequence of optical characteristic measurements, each ripple value indicative of a change of the optical characteristic over a period of time; identifying a first ripple value of the plurality of ripple values that exceeds a threshold ripple value; determining whether a second ripple value of the plurality of ripple values exceeds the threshold ripple value in a first time window, the first time window commencing at a time associated with the first ripple value; in response to a determination that the second ripple value exceeds the threshold ripple value, determining that the first ripple value corresponds to a visual artifact; and generating a visual artifact indication in response to a determination that the first ripple value corresponds to a visual artifact.

In one implementation of the foregoing method, the visual artifact comprises one of a: flashing, shading, flickering, sparkling, scrambling, shifting, juddering, or shut down of one or more pixels.

In another implementation of the foregoing method, the method further comprises: identifying a third ripple value of the plurality of ripple values that exceeds the threshold ripple value; identifying a fourth ripple value of the plurality of ripple values that exceeds the threshold ripple value, the third ripple value and fourth ripple value being within a second time window that has a length shorter than the first time window; and determining that the third ripple value does not correspond to a visual artifact.

In another implementation of the foregoing method, the visual artifact indication comprises at least one of: a notification presented in a user interface identifying the visual artifact, or a calibration signal to a computing component for altering an output provided to the display.

In another implementation of the foregoing method, the optical sensor is housed in a base portion of a computing device that comprises the display, the base portion being movably attached to the display.

In another implementation of the foregoing method, the optical sensor is housed in a display bezel of a computing device, the display bezel being in a plane parallel to the display.

In another implementation of the foregoing method, the optical sensor is externally connected to a computing device coupled to the display.

A computer-readable storage medium is disclosed herein. The computer-readable storage medium has computer program code recorded thereon that when executed by at least one processor causes the at least one processor to perform a method comprising: obtaining a sequence of optical characteristic measurements for at least a portion of a display using an optical sensor, each optical characteristic measurement capturing an optical characteristic of the display at a different time in the sequence; generating a plurality of ripple values based at least on the sequence of optical characteristic measurements, each ripple value indicative of a change of the optical characteristic over a period of time; identifying a first ripple value of the plurality of ripple values that exceeds a threshold ripple value; determining whether a second ripple value of the plurality of ripple values exceeds the threshold ripple value in a first time window, the first time window commencing at a time associated with the first ripple value; in response to a determination that the second ripple value exceeds the threshold ripple value, determining that the first ripple value corresponds to a visual artifact; and generating a visual artifact indication in response to a determination that the first ripple value corresponds to a visual artifact.

In one implementation of the foregoing computer-readable storage medium, the method further comprises: identifying a third ripple value of the plurality of ripple values that exceeds the threshold ripple value; identifying a fourth ripple value of the plurality of ripple values that exceeds the threshold ripple value, the third ripple value and fourth ripple value being within a second time window that has a length shorter than the first time window; and determining that the third ripple value does not correspond to a visual artifact.

In another implementation of the foregoing computer-readable storage medium, the visual artifact indication comprises at least one of: a notification presented in a user interface identifying the visual artifact, or a calibration signal to a computing component for altering an output provided to the display.

In another implementation of the foregoing computer-readable storage medium, the optical sensor is housed in a base portion of a computing device that comprises the display, the base portion being movably attached to the display.

In another implementation of the foregoing computer-readable storage medium, the optical sensor is housed in a display bezel of a computing device, the display bezel being in a plane parallel to the display.

In another implementation of the foregoing computer-readable storage medium, the optical sensor is externally connected to a computing device coupled to the display.

V. CONCLUSION

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" and/or "in response to" are used to indicate an effect being a result of an indicated cause, it is to be understood that the effect is not required to only result from the indicated cause, but that any number of possible additional causes may also contribute to the effect. Thus, as used herein, the terms "based on" and "in response to" should be understood to be equivalent to the term "based at least on" and "at least in response to," respectively.

While various embodiments of the present disclosure have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the claimed embodiments should not be limited by any of the above-described exemplary embodiments, but should be defined only in accordance with the following claims and their equivalents.

What is claimed is:

1. A system for detecting visual artifacts in a display, comprising:
    a processor circuit; and
    a memory that stores program code that is executed by the processor circuit to cause the system to:
        obtain a sequence of optical characteristic measurements for at least a portion of the display using an optical sensor, each optical characteristic measurement capturing an optical characteristic of the display at a different time in the sequence;
        generate a plurality of ripple values based at least on the sequence of optical characteristic measurements, each ripple value indicative of a change of the optical characteristic over a period of time;
        identify a first ripple value of the plurality of ripple values that exceeds a threshold ripple value;
        determine whether a second ripple value of the plurality of ripple values exceeds the threshold ripple value in a first time window, the first time window commencing at a time associated with the first ripple value;
        in response to a determination that the second ripple value exceeds the threshold ripple value, determine that the first ripple value corresponds to a visual artifact; and
        generate a visual artifact indication in response to a determination that the first ripple value corresponds to a visual artifact.

2. The system of claim 1, wherein the visual artifact comprises one of a:
    flashing;
    shading;
    flickering;
    sparkling;
    scrambling;
    shifting;
    juddering; or
    shut down of one or more pixels.

3. The system of claim 1, wherein the program code, when executed by the processor circuit, further causes the system to:
    identify a third ripple value of the plurality of ripple values that exceeds the threshold ripple value;
    identify a fourth ripple value of the plurality of ripple values that exceeds the threshold ripple value, the third ripple value and fourth ripple value being within a second time window that has a length shorter than the first time window; and
    determine that the third ripple value does not correspond to a visual artifact.

4. The system of claim 1, wherein the visual artifact indication comprises at least one of:
    a notification presented in a user interface identifying the visual artifact, or
    a calibration signal to a computing component for altering an output provided to the display.

5. The system of claim 1, wherein the optical sensor is housed in a base portion of a computing device that comprises the display, the base portion being movably attached to the display.

6. The system of claim 1, wherein the optical sensor is housed in a display bezel of a computing device, the display bezel being in a plane parallel to the display.

7. The system of claim 1, wherein the optical sensor is externally connected to a computing device coupled to the display.

8. A method for detecting visual artifacts in a display, comprising:
    obtaining a sequence of optical characteristic measurements for at least a portion of the display using an optical sensor, each optical characteristic measurement capturing an optical characteristic of the display at a different time in the sequence;
    generating a plurality of ripple values based at least on the sequence of optical characteristic measurements, each ripple value indicative of a change of the optical characteristic over a period of time;
    identifying a first ripple value of the plurality of ripple values that exceeds a threshold ripple value;
    determining whether a second ripple value of the plurality of ripple values exceeds the threshold ripple value in a first time window, the first time window commencing at a time associated with the first ripple value;

in response to a determination that the second ripple value exceeds the threshold ripple value, determining that the first ripple value corresponds to a visual artifact; and generating a visual artifact indication in response to a determination that the first ripple value corresponds to a visual artifact.

9. The method of claim 8, wherein the visual artifact comprises one of a:

flashing;
shading;
flickering;
sparkling;
scrambling;
shifting;
juddering; or
shut down of one or more pixels.

10. The method of claim 8, further comprising:

identifying a third ripple value of the plurality of ripple values that exceeds the threshold ripple value;

identifying a fourth ripple value of the plurality of ripple values that exceeds the threshold ripple value, the third ripple value and fourth ripple value being within a second time window that has a length shorter than the first time window; and determining that the third ripple value does not correspond to a visual artifact.

11. The method of claim 8, wherein the visual artifact indication comprises at least one of:

a notification presented in a user interface identifying the visual artifact, or a calibration signal to a computing component for altering an output provided to the display.

12. The method of claim 8, wherein the optical sensor is housed in a base portion of a computing device that comprises the display, the base portion being movably attached to the display.

13. The method of claim 8, wherein the optical sensor is housed in a display bezel of a computing device, the display bezel being in a plane parallel to the display.

14. The method of claim 8, wherein the optical sensor is externally connected to a computing device coupled to the display.

15. A computer-readable storage medium having computer program code recorded thereon that when executed by at least one processor causes the at least one processor to perform a method comprising:

obtaining a sequence of optical characteristic measurements for at least a portion of a display using an optical sensor, each optical characteristic measurement capturing an optical characteristic of the display at a different time in the sequence;

generating a plurality of ripple values based at least on the sequence of optical characteristic measurements, each ripple value indicative of a change of the optical characteristic over a period of time;

identifying a first ripple value of the plurality of ripple values that exceeds a threshold ripple value;

determining whether a second ripple value of the plurality of ripple values exceeds the threshold ripple value in a first time window, the first time window commencing at a time associated with the first ripple value;

in response to a determination that the second ripple value exceeds the threshold ripple value, determining that the first ripple value corresponds to a visual artifact; and generating a visual artifact indication in response to a determination that the first ripple value corresponds to a visual artifact.

16. The computer-readable storage medium of claim 15, wherein the method further comprises:

identifying a third ripple value of the plurality of ripple values that exceeds the threshold ripple value;

identifying a fourth ripple value of the plurality of ripple values that exceeds the threshold ripple value, the third ripple value and fourth ripple value being within a second time window that has a length shorter than the first time window; and determining that the third ripple value does not correspond to a visual artifact.

17. The computer-readable storage medium of claim 15, wherein the visual artifact indication comprises at least one of:

a notification presented in a user interface identifying the visual artifact, or a calibration signal to a computing component for altering an output provided to the display.

18. The computer-readable storage medium of claim 15, wherein the optical sensor is housed in a base portion of a computing device that comprises the display, the base portion being movably attached to the display.

19. The computer-readable storage medium of claim 15, wherein the optical sensor is housed in a display bezel of a computing device, the display bezel being in a plane parallel to the display.

20. The computer-readable storage medium of claim 15, wherein the optical sensor is externally connected to a computing device coupled to the display.

* * * * *